(12) United States Patent
Ueda et al.

(10) Patent No.: US 7,493,353 B2
(45) Date of Patent: *Feb. 17, 2009

(54) STOCHASTIC PROCESSOR, DRIVING METHOD THEREOF, AND RECOGNITION PROCESS DEVICE USING THE SAME

(75) Inventors: Michihito Ueda, Takatsuki (JP); Kiyoyuki Morita, Yawata (JP)

(73) Assignee: Panasonic Corporation, Osaka (JP)

( * ) Notice: Subject to any disclaimer, the term of this patent is extended or adjusted under 35 U.S.C. 154(b) by 1175 days.

This patent is subject to a terminal disclaimer.

(21) Appl. No.: 10/781,819

(22) Filed: Feb. 20, 2004

(65) Prior Publication Data

US 2004/0162725 A1    Aug. 19, 2004

Related U.S. Application Data

(63) Continuation of application No. PCT/JP03/09150, filed on Jul. 18, 2003.

(30) Foreign Application Priority Data

Jul. 22, 2002    (JP)    ............................... 2002-212028

(51) Int. Cl.
G06J 1/00    (2006.01)
G06G 7/00    (2006.01)

(52) U.S. Cl. .......................................... 708/3; 708/801

(58) Field of Classification Search ................ 708/3, 708/250, 255, 801
See application file for complete search history.

(56) References Cited

U.S. PATENT DOCUMENTS 4,176,399 A * 11/1979 Hoffmann et al. ........... 708/250

| | | | |
|---|---|---|---|
| 5,661,421 A | 8/1997 | Ohmi et al. | |
| 5,990,709 A | 11/1999 | Thewes et al. | |
| 6,857,003 B2 * | 2/2005 | Saito | ........................... 708/801 |
| 7,007,060 B2 * | 2/2006 | Miller, Jr. | .................... 708/801 |
| 7,188,131 B2 * | 3/2007 | Bardouillet | .................. 708/251 |
| 2005/0125471 A1 * | 6/2005 | Sturm et al. | ................. 708/250 |

FOREIGN PATENT DOCUMENTS

| | | |
|---|---|---|
| EP | 1 198 008 A1 | 4/2002 |
| JP | 6-252744 A | 9/1994 |
| JP | 11-514163 A | 11/1999 |
| JP | 2000-237167 | 5/2000 |
| JP | 2001-313386 | 11/2001 |
| JP | 2002-118465 A | 4/2002 |
| JP | 2002-123833 | 4/2002 |
| JP | 2003-163332 | 6/2003 |
| JP | 2003-179485 | 6/2003 |

* cited by examiner

*Primary Examiner*—Tan V Mai
(74) *Attorney, Agent, or Firm*—McDermott Will & Emery LLP

(57) ABSTRACT

A stochastic processor of the present invention includes a fluctuation generator configured to output an analog quantity having a fluctuation, a fluctuation difference calculation means configured to output fluctuation difference data with an output of the fluctuation generator added to analog difference between two data, a thresholding unit configured to perform thresholding on an output of the fluctuation difference calculation means to thereby generate a pulse, and a pulse detection means configured to detect the pulse output from the thresholding unit.

37 Claims, 33 Drawing Sheets

STOCHASTIC PROCESSOR, DRIVING METHOD THEREOF, AND RECOGNITION PROCESS DEVICE USING THE SAME

This is a continuation application under 35 U.S.C 111(a) of pending prior International application No. PCT/JP03/09150, filed on Jul. 18, 2003.

BACKGROUND OF THE INVENTION

1. Field of the Invention

The present invention relates to a stochastic processor based on a novel operation principle. More particularly, the present invention relates to a stochastic processor capable of operating vector matching as an essential operation in a recognition process at high speeds, and a recognition process device using the same.

2. Description of the Related Art

With recent spread of personal computers (PCs), processors have been increasingly used at home. In addition to numeric value calculation, personal uses such as Internet, mail, and image processing have been increasing.

However, in the PCs capable of high-speed operations, sufficient speeds are not achieved in all the operations. For example, in order to recognize a voice or speech given off by a person or recognize who a person being viewed through a camera is, enormous amount of operations are required to perform, and therefore, real time processing is difficult.

Basic operation of such recognition process is to store data of a voice or face in vector form, vectorize input data in the same manner and detect approximation between these data, and perform operation as to which of the reference vectors is closest to the input vector. Such vector comparison process is a basic process used in wide variety of data processing such as associative memory, vector quantization, and pattern recognition such as motion prediction, and data compression.

Such vector comparison requires enormous amount of operations in any of the applications. In Neuman-type computers which are typical of the conventional PCs, in principle, the closest vector cannot be extracted unless comparison operations of all the vectors are finished. As a result, very long time is required.

On the other hand, human beings can perform these recognition processes without any difficulty. So, it becomes necessary to compensate for the conventional computers by carrying out these processes at high speeds in selected computers with operation principle different from those of the conventional computers.

One example of the processor based on such a new operation principle is disclosed in Japanese Laid-Open Patent Application Publication No. Hei. 2001-313386, entitled "data processing structure."

FIG. 40 is a perspective view schematically showing a structure of the conventional processor. As shown in FIG. 40, in the conventional processor 220, a power electrode 214 is disposed as opposed to a gate electrode 212 of a minute MISEFT 211, and a plurality of quantum dots 213 and 221 with the magnitude of a nanometer scale are provided between the electrodes 213 and 221. Specifically, a pair of data electrodes 222 are arranged at constant pitch in a widthwise direction of the gate electrode 212 (in a gate width direction), and the quantum dots 221 are arranged in a line shape between the each pair of the data electrodes 222. Reference numeral 301 denotes a virtual plane on which the data electrodes 222 and the quantum dots 221 are arranged. Between the quantum dots 221 arranged in the line shape and the gate electrode 212, the quantum dots 213 are arranged. Thereby, there is an energy barrier between the quantum dots 221 and the gate electrode 212, through which electrons can tunnel.

FIGS. 41A and 41B are schematic views showing an operation principle of the conventional processor 220 by using an equivalent circuit.

Referring to FIGS. 41A and 41B, voltages corresponding to an input pattern (input vector) and a reference pattern (reference vector) are input to each pair of data electrodes 222. These voltages are digital voltages each of which takes a voltage of binary value of 1 or 0. Upon these voltages being input to the each pair of data electrodes 222 with the quantum dots 221 disposed between them, electrons stay in the vicinity of the center by potentials determined by the each pair of data electrodes 222 (see FIG. 41A) or move (see FIG. 41B), which occurs stochastically, thereby causing a drain current of MISFET (Metal Insulator Field Effect Transistor) to vary.

By continuing to monitor the drain current, probability improves with lapse of time. Thereby, a solution close to a strict operation result is gained.

However, the conventional processor 220 has problems. First, because of the use of the quantum dots 213 and 221, it is necessary to wait establishment of a fabrication process of the quantum dots 213 and 221. This is burdensome because there arises a need for a technology other than a current semiconductor process technology.

In addition, comparison is made for so-called binary data in vector comparison. This is effective in obtaining a hamming distance but presents difficulty in calculating a Manhattan distance (absolute value of difference) for frequent use in actual data processing.

In the conventional processor 220, the voltages corresponding to elements of two vectors (input vector and reference vector) to be compared, are input to the each pair of data electrodes 222, where operation for obtaining difference between the elements is carried out in analog and stochastically. A sum of differences between the elements appears as the drain current of the MISFET 211. And, based on the magnitude of the drain current, difference between the two vectors, i.e., degree of approximation is judged. This is problematic, because it becomes necessary to detect the drain current with higher precision with an increase in the number of elements of vectors to be compared. Consequently, it becomes difficult to judge degree of approximation.

SUMMARY OF THE INVENTION

An object of the present invention is to provide a stochastic processor capable of being fabricated in a current semiconductor process technology, a driving method thereof, and a recognition process device using the same.

Another object of the present invention is to provide a stochastic processor capable of calculating a Manhattan distance, a driving method thereof, and a recognition process device using the same.

A further object of the present invention is to provide a recognition process device capable of easily judging a degree of approximation when the number of vectors to be compared is large.

According to the present invention, there is provided a stochastic processor comprising: a fluctuation generator configured to output an analog quantity having a fluctuation; a difference calculation means configured to output fluctuation difference data with an output of the fluctuation generator added to a difference in analog between two data; a thresholding unit configured to perform thresholding on an output of the fluctuation difference calculation means to thereby output a pulse; and a pulse detection means configured to detect the pulse output from the thresholding unit. With such a configuration, the difference in analog between two data is calculated, and therefore, a Manhattan distance can be calculated. In addition, since the fluctuation difference data with the fluctuation added to the difference in analog between the two data is subjected to thresholding and the resulting pulse is output, the difference between the two data can be calculated at a high speed. Further, the stochastic processor is formed by the existing circuit constituents, and therefore can be fabricated by the current semiconductor process technology.

The fluctuation difference calculation means may include a distance calculator configured to calculate difference between the two data in analog, and an adder configured to add an output of the distance calculator to the output of the fluctuation generator.

The fluctuation difference calculation means may include an adder configured to add one of the two data in analog to the output of the fluctuation generator, and a distance calculator configured to calculate a difference between an output of the adder and opposite data of the two data in analog.

The pulse detection means may include a counter configured to count the pulse. In such a configuration, the difference between the two data can be detected with higher precision based on the number of pulses.

The pulse detection means may include an integrator configured to integrate a width of the pulse. In such a configuration, since the pulse width as well as the number of pulses can be detected, the difference between the two data can be detected with higher precision.

The two data may be element data representing elements of two vectors.

The two vectors may be a reference vector and an input vector which are input externally, a plurality of stochastic processing circuits may be provided as corresponding to elements of the reference vector and elements of the input vector, each of the stochastic processing circuits may include a memory configured to store the element data of the input reference vector, the fluctuation difference calculation means configured to output fluctuation difference data with the output of the fluctuation generator added to the difference in analog between the element data of the reference vector stored in the memory and the element data of the input vector, and the thresholding unit, and the pulse detection means may be configured to detect pulses output from the plurality of stochastic processing circuits. In such a configuration, since calculation of difference between vector elements is carried out in parallel, a distance between the input vector and the reference vector, i.e., degree of approximation, can be detected at a high speed. In addition, since the difference between the element of the input vector and the element of the reference vector is output as the pulse, and the degree of approximation between the input vector and the reference vector is detected as the sum of pulses, the degree of approximation can be easily judged even when there are numerous elements of vectors to be compared.

Pulse output ends of the plurality of stochastic processing circuits may be connected in parallel to a common wire having an end connected to the pulse detection means, and delay circuits may be provided on portions of the common wire between positions where the pulse output ends of the stochastic processing circuits are connected to the common wire. In such a configuration, the sum of pulses can be detected with higher precision even when the pulses are output at the same timing from the stochastic processing circuits.

The stochastic processor may further comprise a plurality of vector column comparison circuits each including the plurality of stochastic processing circuits and the pulse detection means. In such a configuration, the input vector can be compared to a plurality of reference vectors at a time.

The memory may be an analog memory, and the element data in analog of the reference vector may be stored in the analog memory. In such a configuration, the reference vectors are pre-written and the input vector is compared to the reference vectors.

The analog memory may include a source follower circuit provided with a gate electrode to which a ferroelectric capacitor is connected, and the element data in analog of the reference vector may be input to and stored in the ferroelectric capacitor.

Paraelectric capacitor may be further connected to the gate electrode of the source follower circuit. In such a configuration, the source follower circuit is sized equally to a peripheral circuit, and therefore, can be fabricated easily.

The fluctuation difference calculation means may include an adder configured to add the difference in analog between the two data or one of the two data in analog to the output of the fluctuation generation circuit; the adder includes a source follower circuit provided with a gate electrode to which first and second capacitors are connected in parallel, wherein the output of the fluctuation generation circuit may be input to the first capacitor, and the difference in analog between the two data or one of the two data in analog may be input to the second capacitor.

The gate electrode of the source follower circuit of the adder may be connected to a ground terminal through a switching device. In such a configuration, charge on the gate electrode of the source follower circuit can be removed.

The counter may be a ripple counter. In such a configuration, the pulses are counted easily. In addition, since the high-order bit of the ripple counter is flagged, the vector column flagged earlier can be easily identified.

The fluctuation may be a chaos fluctuation.

The fluctuation may be a fluctuation obtained by amplifying a noise.

The fluctuation generator may be configured to generate a periodic output as an output having a fluctuation, and a histogram value of an output in one period of the periodic output may be substantially equal.

The distance calculator may include a subtraction device, and the subtraction device may include a source follower circuit provided with a gate electrode to which two capacitors are connected in parallel, and when capacitances of the two capacitors are equal and represented by $C_1$, capacitances of NMIS and PMIS forming the source follower circuit are represented $C_N$ and $C_P$, respectively, and an input voltage that causes an output of the source follower circuit to start increasing from a potential of a low-voltage side voltage source when a voltage is input to the source follower circuit is $V_{Low}$, when a voltage $V_Z$ is calculated according to a formula given by $V_Z=V_{Low}/[2C_1/(2C_1+C_N+C_P)]$, the two data are voltages represented by $V_a$ and $V_b$, subtraction in case of $V_a ≠ V_b$ in operation of $V_a$-$V_b$ is carried out by applying a voltage of $V_1=V_Z-V_a$ and a voltage $V_2=V_Z+V_b$ to electrodes of the two capacitors which are not connected to the gate electrode of the source follower circuit.

The distance calculator may include two subtraction devices, and when the two data are represented by $V_{in}$ and $V_{ref}$ an output $V_{M1}$ may be obtained in one of the two subtraction devices by setting $V_a=V_{in}$, and $V_b=V_{ref}$, an output $V_{M2}$ may be obtained in an opposite subtraction device of the two subtraction device by setting $V_a=V_{ref}$ and $V_b=V_{in}$, and the voltages $V_{M1}$ and $V_{M2}$ are input to the adder, thereby calculating an absolute value of difference between $V_{in}$ and $V_{ref}$.

The thresholding unit may be formed by a CMIS inverter.

A switching device may be provided just before the thresholding unit.

The stochastic processor may further comprise: a current detector configured to detect a current of a power supply line of the thresholding unit; and a fluctuation generator control circuit configured to control the output of the fluctuation generator based on an output of the current detector. In such a configuration, whether or not the pulse is being generated is checked and according to the result, the fluctuation is adjusted, thereby carrying out efficient and high-precision stochastic operation.

The fluctuation generator control circuit may be configured to increase an extent of fluctuation of the fluctuation generator when the current detected by the current detector is smaller than a predetermined value.

The fluctuation generator control circuit may be configured to add a positive bias or a negative bias to the output of the fluctuation generator to cause an average value of the output to be close to a threshold of the thresholding unit, when the current detected by the current detector is smaller than a predetermined value.

According to the present invention, there is provided a method of driving a stochastic processor comprising a plurality of stochastic processing circuits corresponding to elements of a reference vector and elements of an input vector which are input externally, a pulse detection means, and a predetermined number of vector column comparison circuits each having the plurality of stochastic processing circuits and the pulse detection means, wherein each of the stochastic processing circuits includes a fluctuation generator configured to output an analog quantity having fluctuation, a memory configured to store element data of the input reference vector, a fluctuation difference calculation means configured to output fluctuation difference data with the output of the fluctuation generator added to a difference in analog between the element data of the reference vector stored in the memory and the element data of the input vector, and a thresholding unit configured to perform thresholding on an output of the fluctuation difference calculation means and output a pulse, the pulse detection means is configured to detect pulses output from the thresholding units of the plurality of stochastic processing circuits, thereby detecting a distance between the input vector and the reference vector, the method comprising the steps of when columns of the vector column comparison circuits are fewer than columns of the reference vectors and extraction of k (k: natural number) reference vectors closer in distance to the input vector is performed, writing the reference vectors of not more than the columns of the vector column comparison circuits to memories of the plurality of stochastic processing circuits of the vector column comparison circuits; extracting the k reference vectors closer to the input vector from the written reference vectors; and writing at least part of remaining reference vectors to vector column comparison circuits other than the vector column comparison circuits corresponding to the extracted reference vectors, thereby performing the extraction. In such a configuration, even when the columns of the vector column comparison circuits are fewer than columns of the reference vectors, a predetermined number of reference vectors closer to the input vector can be extracted at a high speed. Thereby, finite constituents of the devices can be compensated for.

The steps of writing and extracting the reference vector may be repeated.

According to the present invention, there is provided a recognition process device comprising: the above mentioned stochastic processor; a feature extraction circuit configured to extract a feature of information of an object to be recognized which is input externally and input the extracted feature to the stochastic processor as an input vector; and a memory configured to store a reference vector group composed of vectorized feature of the information of the object, wherein the stochastic processor is configured to identify a reference vector corresponding to the input vector from among the reference vector group stored in the memory, thereby recognizing the information of the object. With such a configuration, since the stochastic processor carries out vector comparison operation at a high speed; the recognition process is performed at a high speed.

The information of the object may be voice.

The reference vector group may be comprised of a vector group with feature quantities of the voice arranged in time series, and have vectors of plural columns in which the feature quantities of the voice recognized as identical by a human being may are shifted from each other in time series.

The information of the object may be an image.

The reference vector group may be comprised of a vector group obtained by vectorizing feature quantities of an image which are recognized as identical by the human being and have different numeric values.

The image recognized as identical by the human being may be a part of the human being, and the feature quantities of the image with different numeric values may be a distance between parts of the human being.

The information of the object may be a behavior of the human being, and the recognized behavior may be output.

The reference vector group may be comprised of a vector group obtained by vectorizing numerically represented data of action information of the human being.

When a reaction to the output behavior is agreeable to the human being, at least part of a value of the reference vector may be changed to allow the reference vector corresponding to the output behavior to be easily selected, and when the reaction to the output behavior is disagreeable to the human being, the at least part of the value of the reference vector may be changed to make it difficult for the reference vector corresponding to the output behavior to be selected.

The action information may involve at least one of an operation history of electric appliance, an output of an infrared sensor, an output of a room-temperature sensor, an output of a humidity sensor, an output of a body temperature sensor, an output of a brain-wave sensor, an output of a pulse sensor, an output of an eye sensor, an output of perspiration sensor, an output of a muscle potential sensor, time information, day information of a week, and the output of the recognition process device.

The above and further objects and features of the invention will more fully be apparent from the following detailed description with accompanying drawings.

DETAILED DESCRIPTION OF THE PREFERRED EMBODIMENT

Hereinafter, embodiments of the present invention will be described with reference to the drawings.

Embodiment 1

Figure 1:
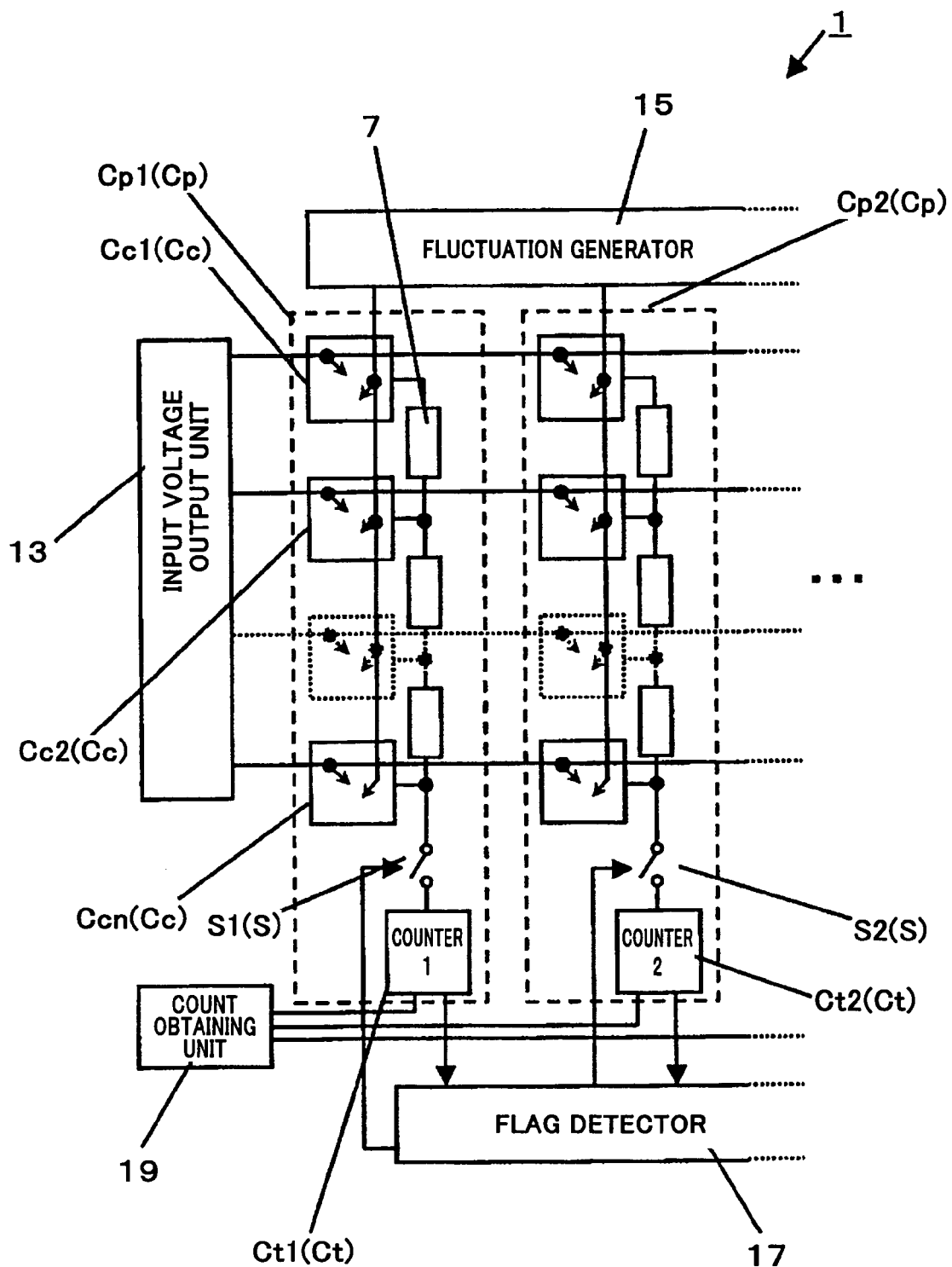
FIG. 1 is a circuit diagram showing a configuration of a stochastic processor according to a first embodiment of the present invention.

FIG. 1 is a circuit diagram showing a configuration of a stochastic processor according to a first embodiment of the present invention.

In a stochastic processor 1 of this embodiment, a distance between two vectors, i.e., an input vector and a reference vector is calculated in parallel and at a high speed in such a manner that a vector column comparison circuit Cn capable of varying the number or width of pulses generated according to a distance between corresponding elements between the two vectors is a basic cell, and a pulse output from the basic cell is counted for the same vector column.

In particular, in this embodiment, a signal that is random like chaos, is superposed in order to obtain a pulse output from the basic cell. In this embodiment, a voltage is used as a physical quantity representing vector data. Here, a Manhattan distance will be described as the distance corresponding to the difference between the vectors. Specifically, an absolute value of the difference between vector elements will be calculated as the distance.

Turning now to FIG. 1, the stochastic processor 1 comprises vector column comparison circuits Cp, an input voltage output unit 13, a fluctuation generator 15, a count obtaining unit 19, and a flag detector 17.

The vector column comparison circuits Cp are provided in m columns (e.g., 1000 columns in this embodiment). Hereinbelow, the vector column comparison circuit Cp on y-th column (y: natural number of 1 to m) is represented by Cpy, and an arbitrary vector column comparison circuit Cp is represented by Cp without adding subscript (y).

Each vector column comparison circuit Cp comprises n (e.g., 14 in this embodiment) stochastic processing circuits Cc, delay circuits 7, a switch S, and a counter Ct. In one vector column comparison circuit Cp, the stochastic processing circuits Cc are provided as corresponding to vector elements to be compared. Therefore, the stochastic processor 1 is capable of comparing vectors having elements of not less than 2 and not more than n. As described later, m input vectors are written to the entire vector column comparison circuits Cp1 to Cpm, and an input vector written to the vector column comparison circuit Cc is called a vector column.

The stochastic processing circuits Cc are arranged in matrix of n×m in the m-column vector column comparison circuits Cp. Therefore, as shown in FIG. 1, in a vector column comparison circuit Cp, the stochastic processing circuit Cc is specified by a row, the stochastic processing circuit Cc on x-th row (x: 1 to n (natural number)) is represented by Ccx, and an arbitrary stochastic processing circuit Cc is represented by Cc without adding a subscript (x). And, a switch S and a counter Ct on y-th column are represented by Sty and Cty, respectively, and an arbitrary switch S and a counter Ct are represented by S and Ct, respectively without adding a subscript (y).

The delay circuit 7 is, for example, constituted by an inverter. Output terminals of adjacent stochastic processing circuits Cc are connected to each other through the delay circuit 7, and an output terminal of the stochastic processing circuit Ccn on a last row is connected to the counter Ct through the switch S.

An input voltage output unit 13 converts input data comprising elements of the input vector and elements of the reference vector into voltages and outputs the voltages to the corresponding stochastic processing circuits Cc1 to Ccn, respectively. The input voltage output unit 13 calculates the input data according to a formula described below, and outputs the resulting data.

The fluctuation generator 15 has a function to output voltages with fluctuation (hereinafter referred to as fluctuation voltages) and output these voltages to the stochastic processing circuits Cc1 to Ccn on all rows of the vector column comparison circuits Cp1 to Cpm on all columns.

In each vector column comparison circuit Cp, the stochastic processing circuits Cc1 to Ccn output pulses as described later. The pulses output from the stochastic processing circuits Cc1 to Ccn are regulated by the corresponding delay circuits 7 so as not to overlap with each other. Even if a fluctuation voltage is input to the vector column comparison circuit Cp under the condition in which the switch S is in On-state, thereby causing all the stochastic processing circuits Cc1 to Ccn to output pulses, n pulse trains (14 in this embodiment) are input at predetermined intervals to the counter Ct.

The counter Ct counts pulses. In this embodiment, as the counter Ct, an asynchronous ripple counter using D flip-flop described later, is used.

The counter Ct outputs a most significant bit to the flag detector 17. Thereby, the flag detector 17 detects one of the counters Ct1 to Ctm, whose value has become a predetermined one first, and hence one of the vector column comparison circuits Cp1 to Cpm. Thereby, the input vector which approximates the reference vector with a degree higher than a predetermined degree can be extracted at a high speed.

Meanwhile, the counts of the counters Ct are output to the count obtaining unit 19. Thus, the count obtaining unit 19 obtains outputs of all the vector column comparison circuits Cp1 to Cpm.

When the fact that time required to output a solution is short is important than precision, a comparator (not shown) may compare the counts of the vector column comparison circuits Cp1 to Cpm, which have been obtained by the count obtaining unit 19, thereby extracting input vectors that approximate the reference vectors with higher degrees in the order of degree of approximation. Since the vector column comparison circuits Cp are much fewer than the stochastic processing circuits Cc, such comparison can be carried out at a sufficiently high speed even in the conventional computer.

Subsequently, a configuration of individual constituents constituting the stochastic processor of this embodiment, will be described.

Figure 2:
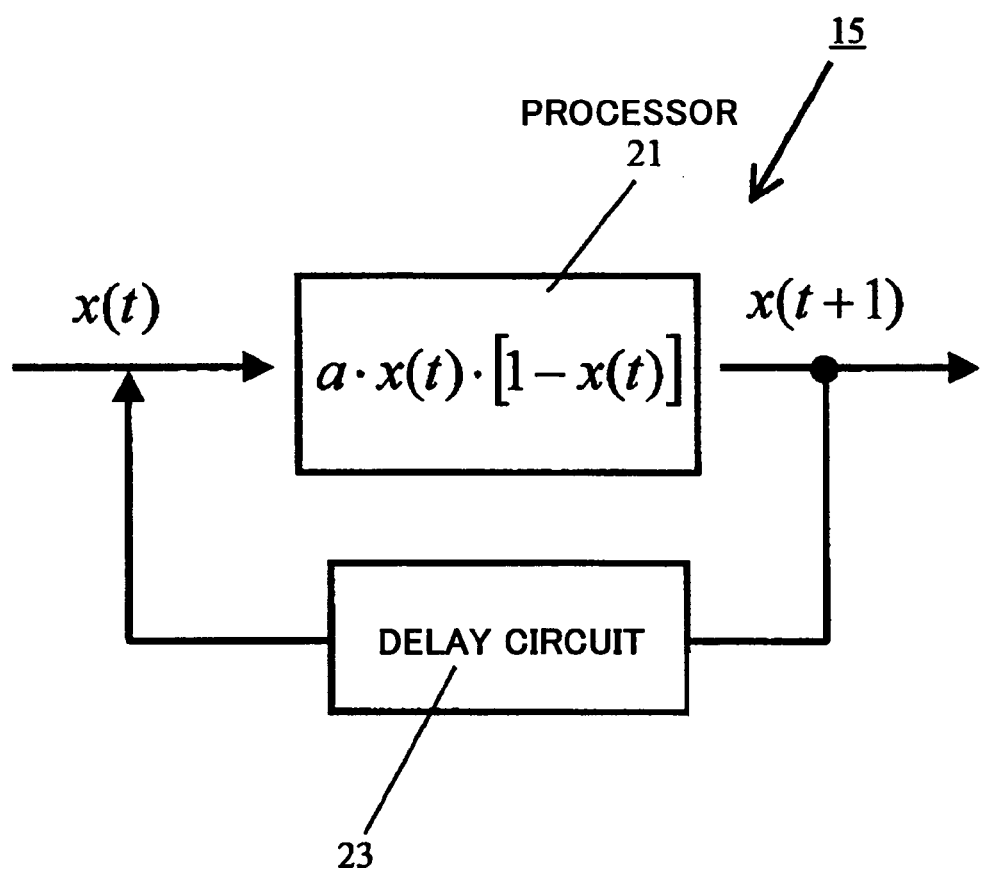
FIG. 2 is a block diagram showing an example of a configuration of a fluctuation generator in FIG. 1.

FIG. 2 is a block diagram showing an example of a configuration of the fluctuation generator 15 in FIG. 1.

As shown in FIG. 2, the fluctuation generator 15 comprises an operation unit 21 and a delay circuit 23. As defined herein, the fluctuation refers to regular or irregular fluctuation of analog quantity (physical quantity) and meets the following conditions. In the case of the irregular fluctuation, it is necessary that an average value of the fluctuating analog quantity is not substantially biased on a time axis. In the case of the regular fluctuation, an extent of fluctuation of periodic fluctuation fluctuates with a predetermined period, and it is necessary that an average value of the analog quantity fluctuating within the predetermined period is not substantially biased on the time axis. Hereinbelow, the irregular fluctuation will now be described and the regular fluctuation will be described in the eighth embodiment.

In recent years, with regard to a circuit for generating such fluctuation, a random number generation circuit or a chaos generation circuit has been extensively studied. For example, a chaos generation circuit by Morie et al. which is described in "CMOS circuits generating arbitrary chaos by using pulse width modulation techniques," IEEE Transactions on Circuits and Systems—I: Fundamental theory and applications, vol. 47, No. 11, November 2000, pp. 1652-1657, can be used.

There have been reported several kinds of chaos. FIG. 2 shows an example of an example of a configuration for generating logistic chaos. The operation unit 21 in FIG. 2 carries out operation on input vector data x(t) according to the following formula.

$$x(t+1) = a \cdot x(t) \cdot [1 - x(t)] \quad (1)$$

where a is a constant, for example, 3.96. When an input voltage V at a time point is x(t), a result of an operation on x(t) according to the formula (1) is output voltage x(t+1). The x(t+1) is made into an input for a subsequent step by the delay circuit 23. Thereby, chaos fluctuation voltage is generated.

Although not shown, a random voltage is gained in the same manner by, for example, amplifying thermal noises generated on the semiconductor substrate without the use of the chaos generation circuit.

Figure 3:
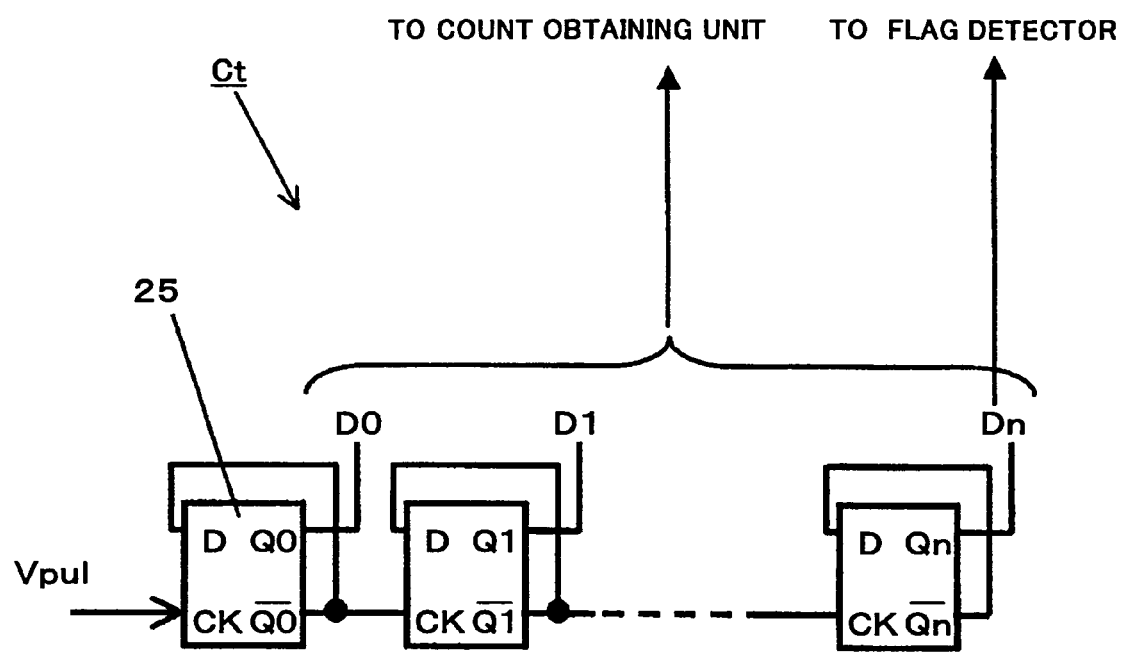
FIG. 3 is a circuit diagram showing an example of a configuration of a counter in FIG. 1.

FIG. 3 is a circuit diagram showing an example of a configuration of the counter in FIG. 1.

In FIG. 3, reference numeral 25 denotes the D flip-flop. In this embodiment, the counter Ct is constituted by an asynchronous counter using so-called D flip-flop. Upon a voltage pulse Vpu1 being input to the counter Ct, High outputs of $D_0$, $D_1$, ..., $D_n$ are switched in binary form. In order to detect the vector column that has reached a maximum count, the output of $D_n$ is connected to the flag detector 17 so that the vector column whose $D_n$ becomes High first is detected. In order to extract a plurality of vector columns closest to the reference vectors, the flag detector 17 is configured to always count the number of flags with "High."

By setting the flag in a lower bit instead of the most-significant bit (digit), the flag becomes High earlier stochastically. Therefore, the operation speed has precedence over precision.

As described above, instead of using such a flag detector 17, the counts may be obtained by the count obtaining unit 19 and the counts may be compared in a comparator (not shown).

Figure 4:
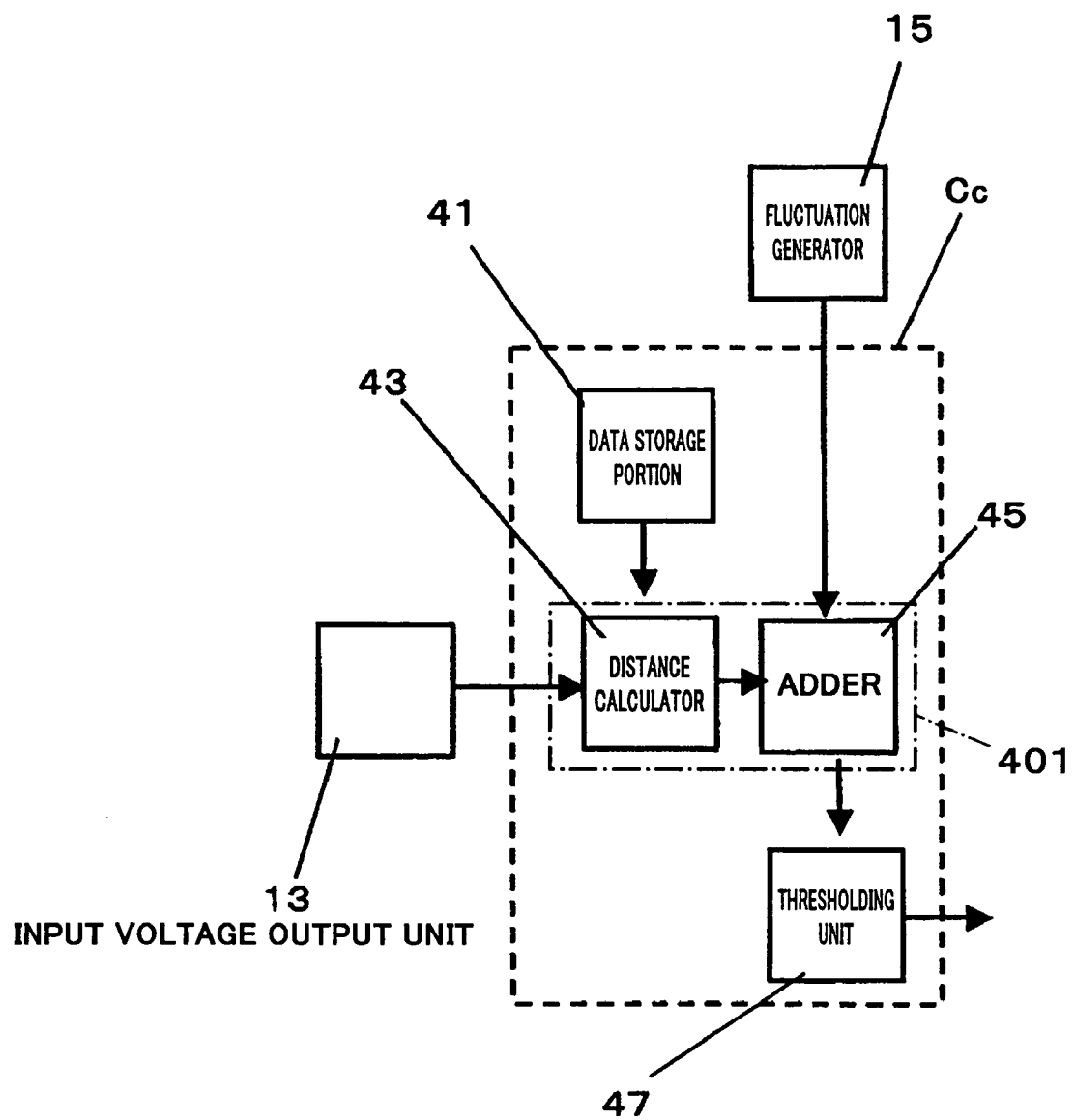
FIG. 4 is a block diagram showing a detailed configuration of the stochastic processing circuit in FIG. 1.

FIG. 4 is a block diagram showing a detailed structure of the stochastic processing circuit Cc in FIG. 1.

Referring to FIG. 4, the stochastic processing circuit Cc has a data storage portion 41, a distance calculator 43, an adder 45, and a thresholding unit 47. The distance calculator 43 and the adder 45 constitute a fluctuation difference calculation means 401. One reference vector data (precisely, data of an element of a reference vector) is written to the data storage portion 41 through a wire (not shown). The distance calculator 43 outputs a voltage proportional to an absolute value corresponding to a difference between input vector data (precisely data of an element of an input vector) output from the input voltage output unit 13 and the reference vector data stored in the data storage portion 41. The adder 45 outputs the voltage proportional to the magnitude of a sum of the output of the distance calculator 43 and the output of the fluctuation generator 15, i.e., superposed voltage.

As defined herein, addition refers to operation of analog quantity proportional to a sum of plural analog quantities.

The thresholding unit 47 carries out thresholding on the output of the adder 45. The output of the thresholding unit 47 is output to the switch 9 directly or through the delay circuit 7, as shown in FIG. 1.

Figure 5:
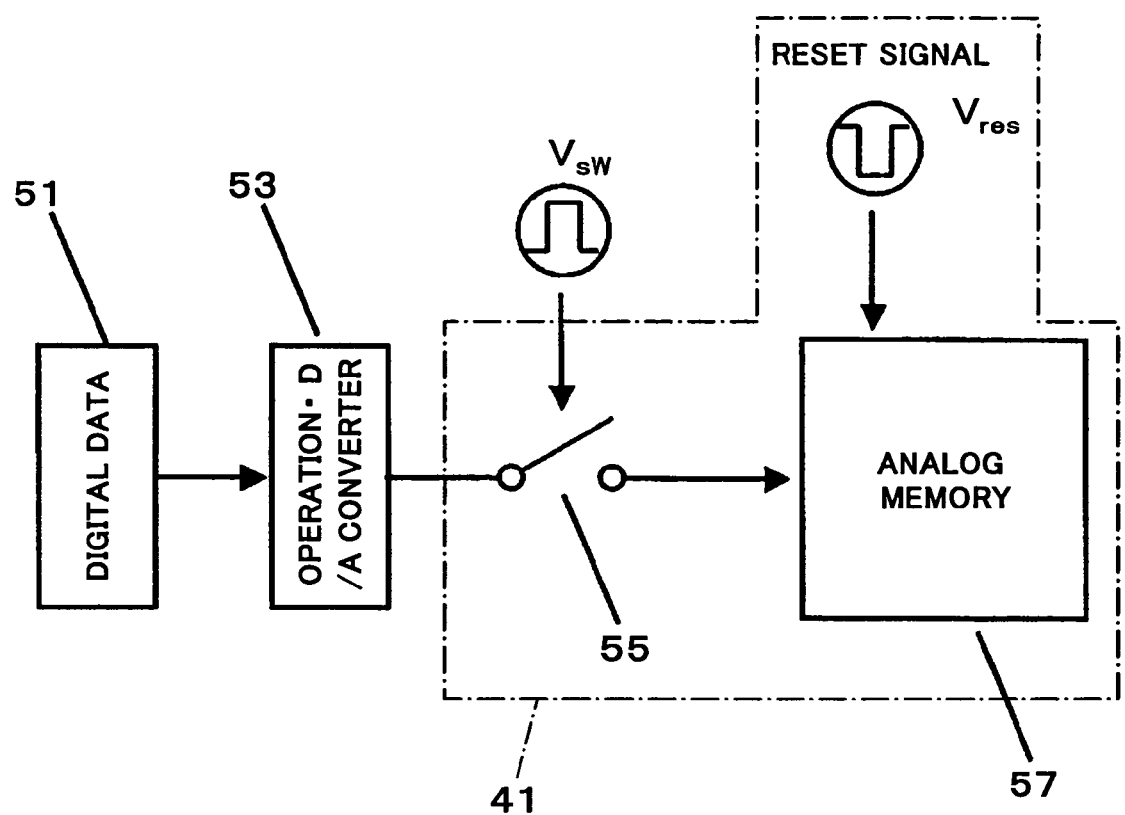
FIG. 5 is a block diagram showing an example of a configuration of a data storage portion in FIG. 4.

FIG. 5 is a block diagram showing an example of a configuration of the data storage portion 41 in FIG. 4. Referring to FIG. 5, the data storage portion 41 comprises an operation • D/A converter 53, a switch 55, and an analog memory 57. Reference numeral 51 represents digital reference vector data (precisely, data of an element of the reference vector). The reference vector data is stored in, for example, DRAM or flash memory, or external storages such as hard disc.

The operation • D/A converter 53 performs a simple operation in digital described later and converts the digital reference vector data 51 into analog reference vector data represented by the physical quantity (voltage in this embodiment). The analog reference vector data is input to the analog memory 57 in pulse through the switch 55 and stored in the data storage portion 41. The analog memory 57 comprises a means for inputting a reset signal. As used herein, the analog refers to representation of data (e.g., numeric value) by continuous physical quantities (e.g., voltage).

Figure 6:
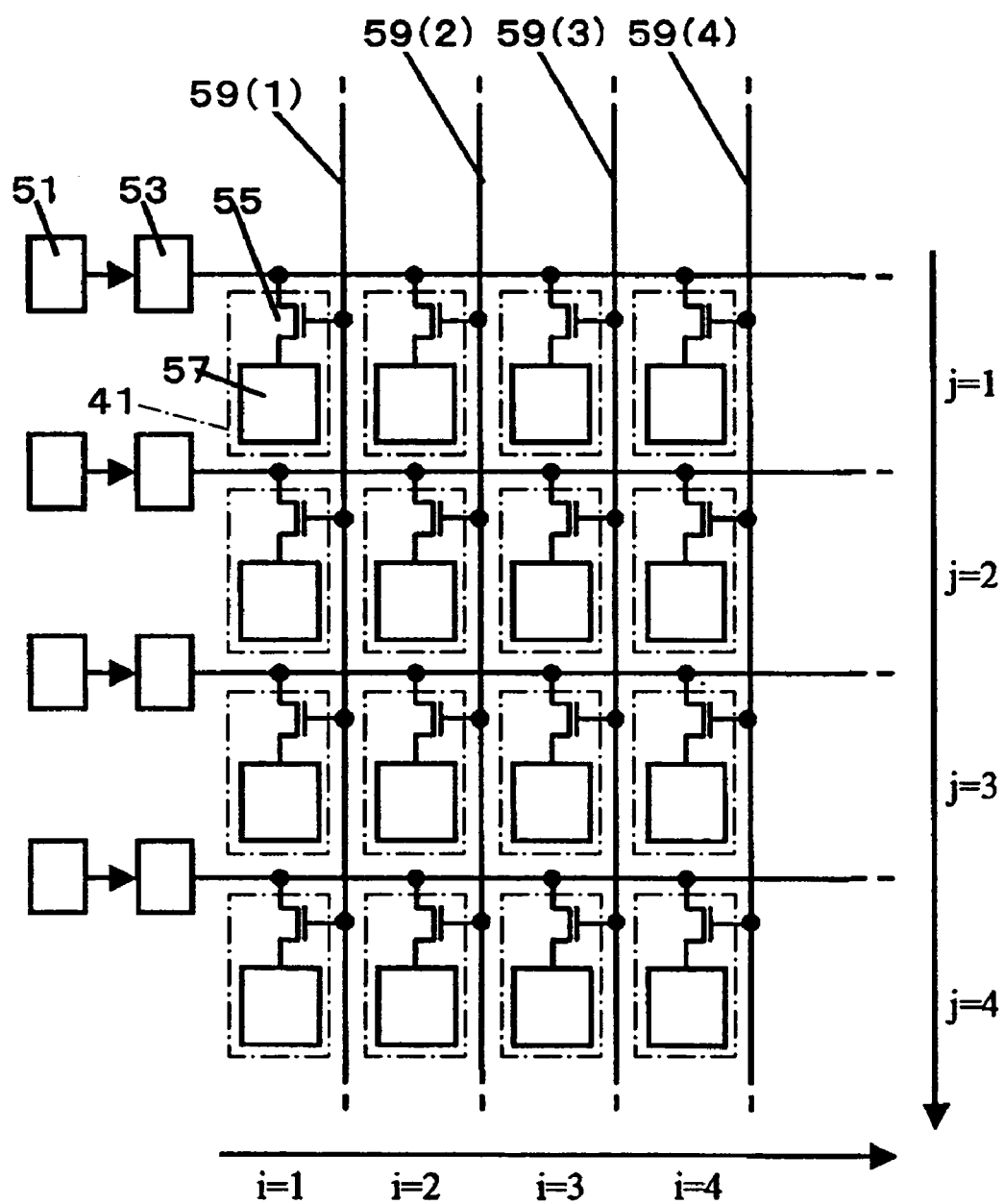
FIG. 6 is a circuit diagram showing an example of a configuration of an analog memory cell array of this embodiment.

FIG. 6 is a circuit diagram showing an example of a configuration of the analog memory cell array of this embodiment.

In FIG. 6, reference numerals 59(1), 59(2), ... denote wires. The analog memory 57 in FIG. 5 is included in each of the stochastic processing circuits Cc in FIG. 1 which are arranged in matrix. This follows that the analog memories 57 are arranged in matrix as corresponding to the stochastic processing circuits Cc. The analog memories 57 arranged in matrix constitute the memory cell array in FIG. 6.

FIG. 6 shows the memory cell array with i vector columns and j vector elements. In this configuration, the memory cell array has i×j analog memories 57. In FIG. 6, part of the memory cell array, i.e., 4×4 analog memories are shown. Also, wire for reset are omitted.

In the memory cell array, as corresponding to columns of the analog memories 57 (vector columns), wires 59(1), 59(2), ... for turning On/Off the switches 55 are provided. The operation • D/A converter 53 is provided for each row (element of the vector) of the analog memory 57.

In the analog cell array configured as described above, when one of the wires 59(1), 59(2), ... is selected and set High, and all the switches 55 on the corresponding column are turned ON, the digital reference vector data 51 is converted into the analog reference vector data by the operation • D/A converter 53 to be written in parallel to the analog memories 57 on the selected column. This column selection and write operation are sequentially performed for the analog memories 57 in all columns, thereby allowing the reference vector data to be written at high speeds.

Such matrix write operation becomes possible by the analog memories 57 having non-volatility as described later.

In the configuration in FIG. 6, i columns of vectors each having j elements are written to the memory cell array for each vector column. Alternatively, the vectors may be sequentially written to the memory cell array for each vector element. In this case, as corresponding to the rows (vector elements) of the analog memories 57, the wires 59(1), 59(2), ... are provided and the operation • D/A converter 53 is provided for each column (vector column) of the analog memories 57.

Figure 7:
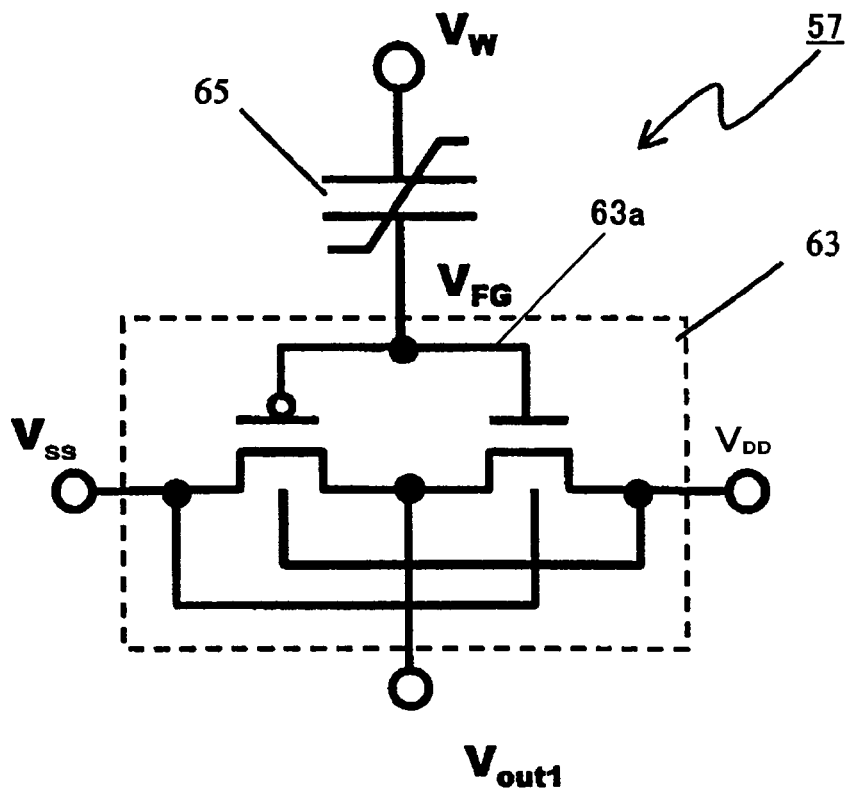
FIG. 7 is a circuit diagram showing a first configuration of an analog memory in FIG. 5.
Figure 8:
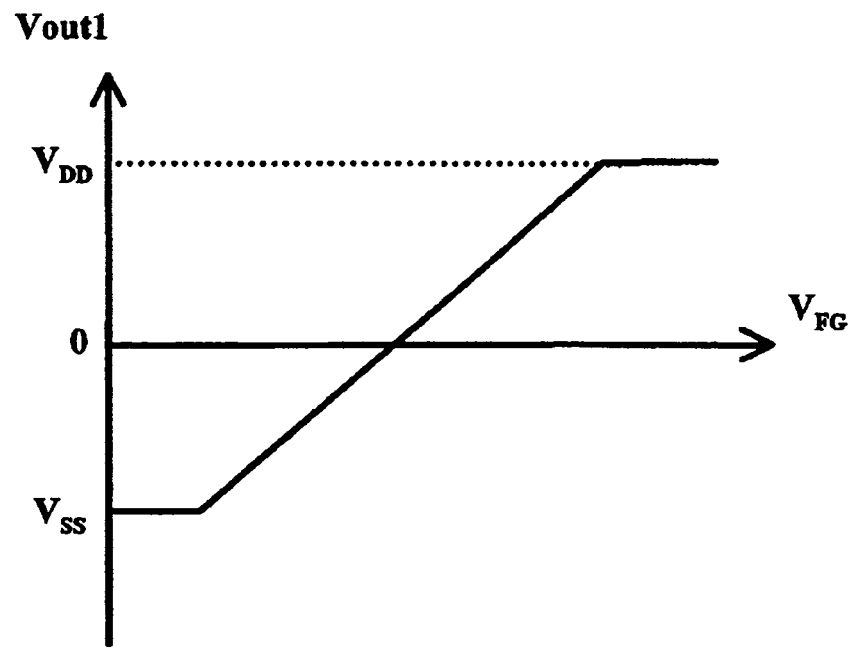
FIG. 8 is a graph showing an input-output characteristic in a source follower circuit for use in the analog memory in FIG. 5.

FIG. 7 is a circuit diagram showing a first configuration of the analog memory 57 in FIG. 5, and FIG. 8 is a graph showing an input-output characteristic of a source follower circuit for use in the analog memory 57 in FIG. 5.

As shown in FIG. 7, the analog memory 57 of the first configuration comprises a source follower circuit 63, and a ferroelectric capacitor 65 connected to a gate electrode (hereinafter referred to as a floating gate electrode) 63a of CMIS-FET (Complementary MISFET, hereinafter referred to as CMIS) forming the source follower circuit 63.

As shown in FIG. 8, the source follower circuit 63 has a feature in which a voltage $V_{out1}$ proportional to an input voltage $V_{FG}$ over a range thereof within a power supply voltage $V_{DD}$ is output.

Subsequently, an operation of the analog memory 57 configured as described above will be described.

Upon a write voltage $V_w$ (voltage corresponding to reference vector data of analog) being applied to the ferroelectric capacitor 65, polarization occurs in the ferroelectric, thereby causing a potential $V_{FG}$ of the floating gate electrode 63a to vary. Thereby, the source follower circuit 63 outputs the voltage $V_{out1}$ according to the varied potential $V_{FG}$, based on its feature. Here, the residual polarization of the ferroelectric of the ferroelectric capacitor 65 is held in a non-volatile state. Thereby, the voltage $V_w$ is stored in the analog memory 57 in the non-volatile state. That is, the voltage $V_w$ is written to the analog memory 57. Simultaneously, the voltage $V_{out1}$ according to the written voltage $V_w$ is output through the source follower circuit 63. Since the analog memory 57 has non-volatility, the output of the operation • D/A converter 53 is switched properly, thereby performing a write operation, and an occupied area of the operation • D/A converter 53 or wires for writing can be significantly reduced.

Thus, polarization value of the ferroelectric of the ferroelectric capacitor 65 can obtain a multiple value depending on the magnitude or history of the write voltage $V_w$. Therefore, the ferroelectric capacitor 65 functions as an analog memory.

In particular, since this structure has a two-transistor—one capacitor, a cell occupied area is advantageously small.

Figure 9:
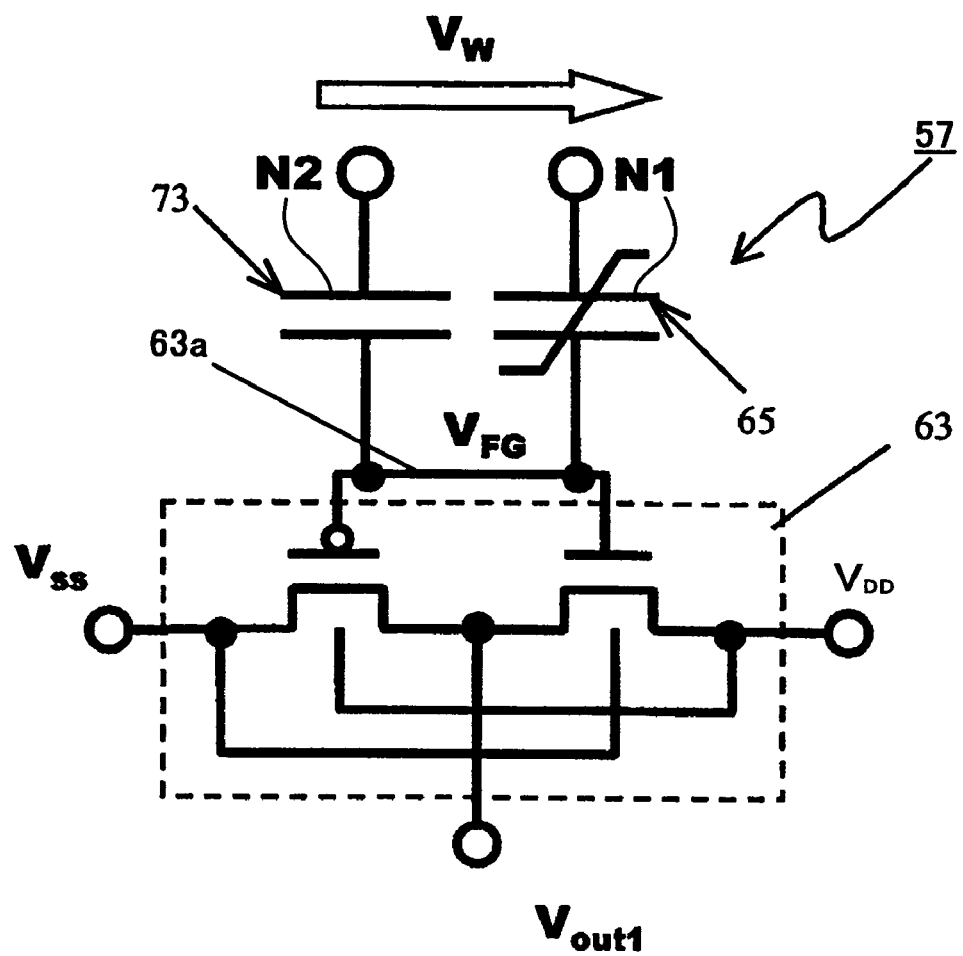
FIG. 9 is a circuit diagram showing a second configuration of the analog memory in FIG. 5.

FIG. 9 is a circuit diagram showing a second configuration of the analog memory 57 in FIG. 5.

As shown in FIG. 9, the analog memory 57 of this example comprises a source follower circuit 63, and a ferroelectric capacitor 65 and a paraelectric capacitor 73 connected in parallel to the floating gate electrode 63a of the CMIS forming the source follower circuit 63.

In the analog memory 57 of this example configured as described above, by applying the write voltage $V_w$ across an upper electrode N1 of the ferroelectric capacitor 65 and an upper electrode N2 of the paraelectric capacitor 73, the value of the potential $V_{FG}$ of the floating gate electrode varies, and thereby the analog memory 57 functions as the analog memory, as in the first configuration.

In general, since the ferroelectric has a high dielectric constant, in the configuration in FIG. 7 with the ferroelectric capacitor 65 and a gate capacitance of the MISFET forming the source follower circuit 63 being arranged in series, the voltage is less likely to be given to the ferroelectric. For this reason, the size of the MISFET forming the source follower circuit 63 needs to be increased. On the other hand, in the configuration of this example, the potential $V_{FG}$ is determined by a balance of capacitance between the ferroelectric capacitor 65 and the paraelectric capacitor 73. Therefore, the MISFET is made equal in size to a peripheral circuit, and hence easily fabricated. It is highly desirable to use a material with a high dielectric constant for the paraelectric capacitor 73. For example, by using barium strontium titanate (BST), the paraelectric capacitor 73 can be made equal in size to the ferroelectric capacitor 65.

Figure 10:
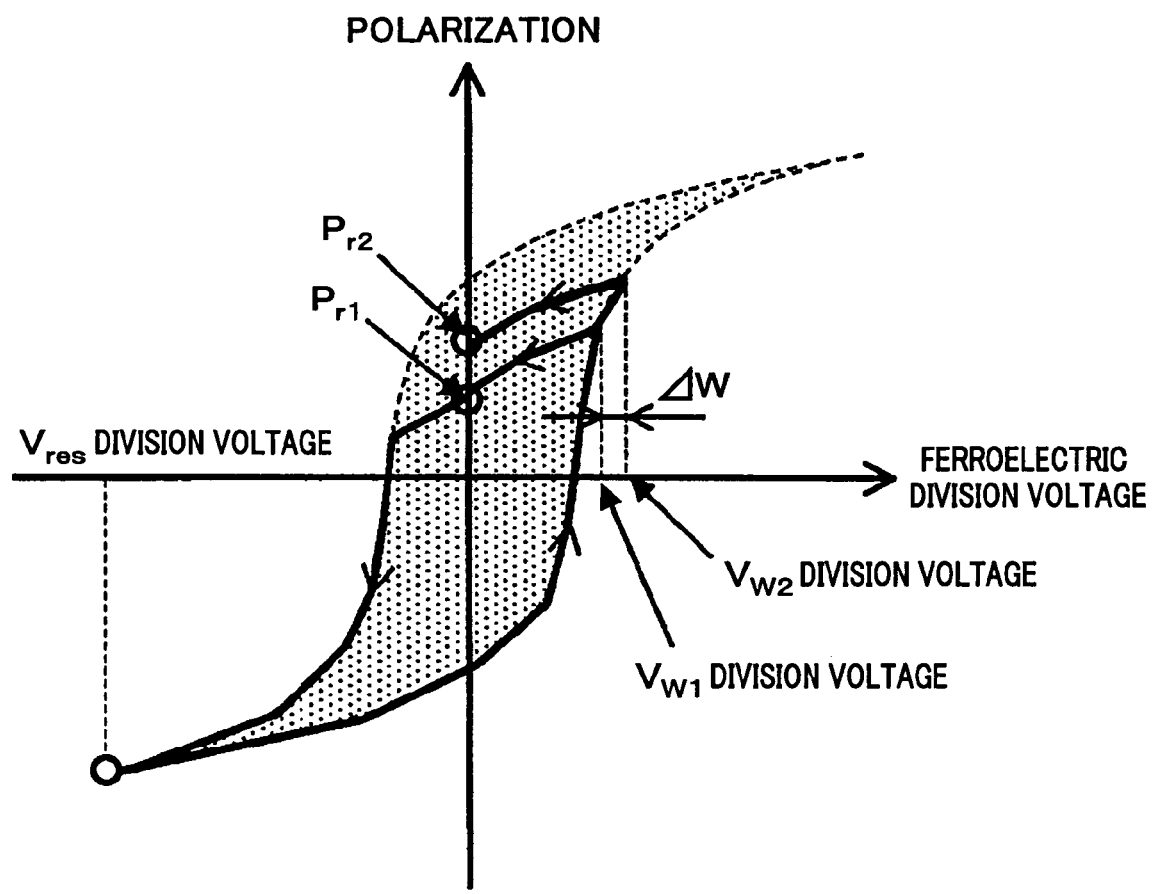
FIG. 10 is a graph showing a hysteresis characteristic of a ferroelectric capacitor in FIGS. 7 and 9.

FIG. 10 is a graph showing a hysteresis characteristic of the ferroelectric capacitor in FIGS. 7 and 9.

In FIG. 10, an abscissa axis represents a division voltage of the ferroelectric. In the case of the analog memory 57 in FIG. 7, this division voltage is calculated as $[V_w]-[V_{FG}]$. In the case of the analog memory 57 in FIG. 9, the division voltage is represented as the voltage given to the ferroelectric with the write voltage $V_w$ being applied.

As shown in FIG. 10, the ferroelectric takes different residual polarization values according to a voltage application history under the condition in which an equal voltage is applied, because the ferroelectric has a hysteresis characteristic. Accordingly, in this embodiment, by applying a reset pulse $V_{res}$ to cause polarization to be saturated to be negative or positive, and then by applying the write voltage $V_w$, $V_{FG}$ well corresponding to the write voltage $V_w$ is obtained. Specifically, when the reset pulse $V_{res}$ is first applied and then $V_{w1}$ is applied, polarization of the ferroelectric moves on a saturation curve and the residual polarization becomes $P_{r1}$, while when the reset pulse $V_{res}$ is first applied and then $V_{w2}$ is applied, the residual polarization becomes $P_{r2}$ in the same manner. That is, the residual polarizations $P_{r1}$ and $P_{r2}$ are uniquely determined with respect to the write voltages $V_{w1}$ and $V_{w2}$. The residual polarization values determine the potential $V_{FG}$ of the floating electrode, and the analog voltage $V_{out1}$ is output according to the characteristic of the source follower circuit 63. Thus, the analog memory 57 of this embodiment has fewer constituents and non-volatility, and therefore is extremely effective to the stochastic processor.

Figure 11:
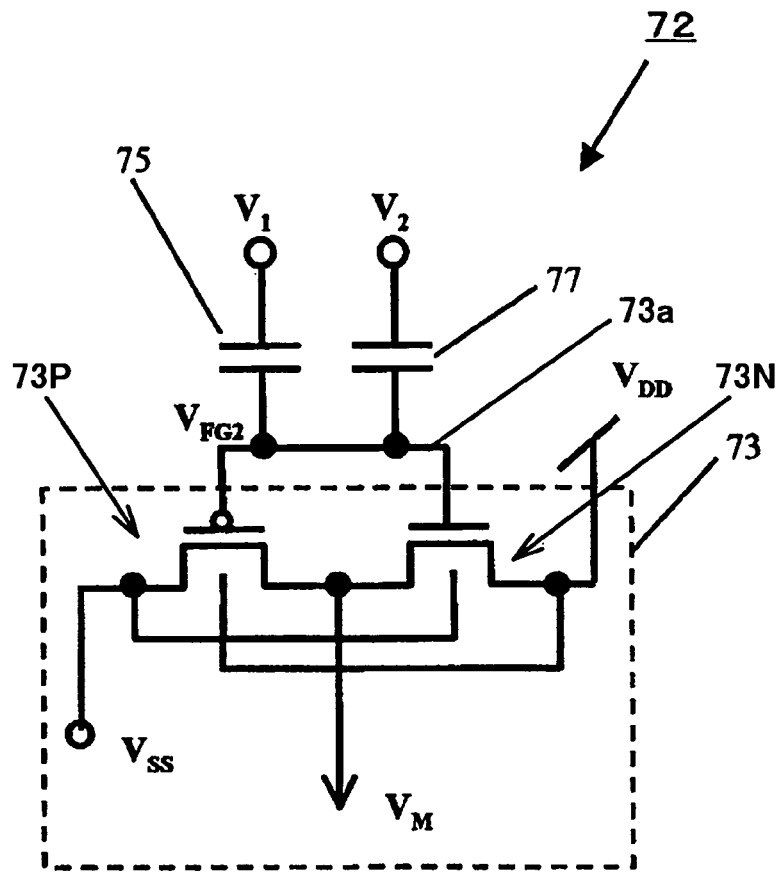
FIG. 11 is a circuit diagram showing a configuration of a subtraction device forming a distance calculator in FIG. 1.

FIG. 11 is a circuit diagram showing a configuration of a subtraction device forming a distance calculator 43 in FIG. 1.

In FIG. 11, the subtraction device 72 comprises the source follower circuit 63, and a first capacitor 75 and a second capacitor 77 connected in parallel to the gate electrode (floating gate electrode) 73a of the CMIS forming the source follower circuit 63. The voltage $V_1$ is input to the first capacitor 75. The voltage $V_2$ is input to the second capacitor 77. Definitions of the voltages $V_1$ and $V_2$ will be described later.

Subsequently, an operation of the subtraction device 72 configured as described will be described.

When the potential of the floating gate electrode 73a in the source follower circuit 73 is $V_{FG2}$, the capacitance of the first capacitor is $C_1$, the capacitance of the second capacitor is $C_2$, and the capacitances of a P channel CMIS (hereinafter simply referred to as PCMIS) 73P and a N channel CMIS (hereinafter simply referred to as NCMIS) 73N are $C_P$ and $C_N$, respectively, the following formula is established according to a charge retention rule:

$$Q = C_1(V_1 - V_{FG2}) + C_2(V_2 - V_{FG2}) = V_{FG2}(C_P + C_N) \quad (2)$$

Here, $C_1 = C_2$, and $\alpha$ is defined according to the following formula:

$$\alpha = \frac{C_1}{2C_1 + C_N + C_P} = \frac{1}{2 + \left[\frac{C_N + C_P}{C_1}\right]} \quad (3)$$

From the formulae (2) and (3), the following formula is obtained.

$$V_{FG2} = \alpha(V_1 + V_2) \quad (4)$$

According to the characteristic of the source follower circuit, the voltage $V_{M1}$ corresponding to the potential $V_{FG2}$ is output. That is, the output proportional to the sum of $V_1$ and $V_2$ is obtained. In the formula (3), when $C_1$ is larger relative to $(C_N + C_P)$, that is, a gate capacitance of the MISFET is sufficiently small, $\alpha$ approximates 0.5 and the subtraction device 72 exhibits a characteristic in which a value near an average value of the input voltages is output.

Here, the voltages given by the following formulae are input as $V_1$ and $V_2$, respectively.

$$V_1 = V_Z + V_{ref} \quad (5)$$

$$V_2 = V_Z - V_{in} \quad (6)$$

where $V_Z$ is a correction voltage and is operated according to the formula described later. $V_{in}$ corresponds to the input vector data and the input voltage output unit 13 in FIG. 4 outputs an operation result of the formula (6) as the voltage. $V_{ref}$ corresponds to reference vector data, and the data storage portion 41 of the stochastic processing circuit Cc in FIG. 4 outputs the voltage corresponding to the operation result of the formula (5).

From these formulae and the formula (4), the following formula is established.

$$V_{FG2} = 2\alpha V_Z + \alpha(V_{ref} - V_{in}) \quad (7)$$

That is, a voltage resulting from shifting the difference between the voltage $V_{ref}$ corresponding to the reference vector data (hereinafter referred to as a reference vector voltage) and the voltage $V_{in}$ corresponding to the input vector data (hereinafter referred to as an input vector voltage) by a bias of $2 \cdot V_Z$ is obtained as $V_{FG2}$, thus carrying out difference calculation effectively.

Figure 12:
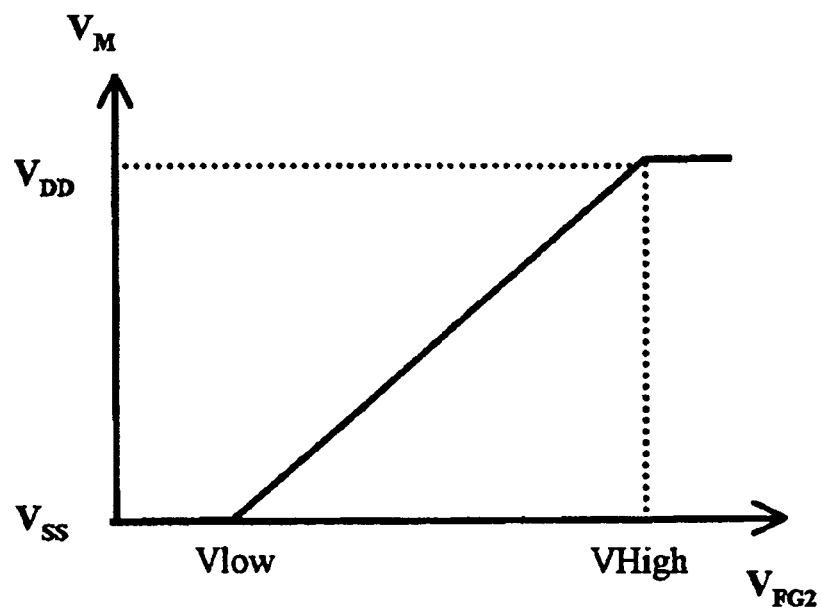
FIG. 12 is a graph showing an input-output characteristic of the source follower circuit forming the subtraction device in FIG. 11.

FIG. 12 is a graph showing an input-output characteristic of the source follower circuit 73 forming the subtraction device 72 in FIG. 11.

As shown in FIG. 12, with respect to an input voltage $V_{FG2}$ in the range of $V_{Low}$ to $V_{High}$, the source follower circuit 73 outputs a voltage $V_M$ in the range of $V_{SS}$ to $V_{DD}$.

Here, using $V_{Low}$ from which the output of the source follower circuit 73 starts to increase linearly, the above described $V_Z$ is determined to satisfy the following formula:

$$V_{low} = 2\alpha V_Z \qquad (8)$$

Then, for the difference between $V_{ref}$ and $V_{in}$, the source follower circuit 73 has an output characteristic as represented by the following formula:

$$V_{out2} = \begin{cases} 0 & (V_{ref} - V_{in} < V_{SS}) \\ V_{FG2} - 2\alpha V_z & (V_{DD} + 2\alpha V_z \geq V_{ref} - V_{in} \geq V_{SS}) \\ V_{DD} & (V_{ref} - V_{in} \geq V_{DD} + 2\alpha V_z) \end{cases} \qquad (9)$$

Figure 13:
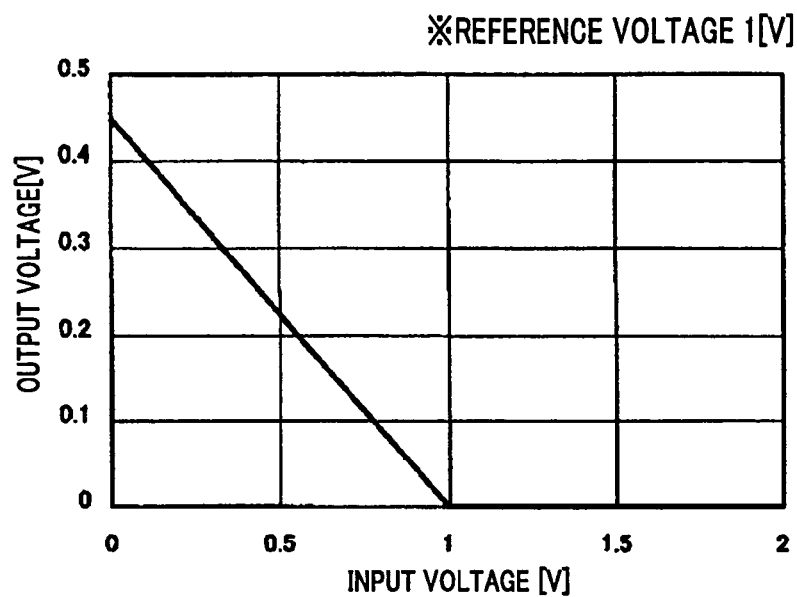
FIG. 13 is a graph showing an input-output characteristic of the subtraction device in $V_{SS}=0[V]$, $V_{DD}=1[V]$, and $\alpha=0.45$ in the case where a reference vector voltage is 1[V]

FIG. 13 shows an input-output characteristic of the subtraction device 72 when the reference vector voltage $V_{ref}=1$ [V] ($V_{SS}=0$[V], $V_{DD}=1$[V], and $\alpha=0.45$). It should be understood that the output voltage increases proportionally when difference between the reference vector voltage $V_{ref}$ and the input voltage $V_{in}$ is positive, and only positive difference calculation is carried out.

Likewise, by setting $V_1$ and $V_2$ as represented by the following formulae, reverse difference calculation is carried out.

$$V_1 = V_Z - V_{ref} \qquad (10)$$

$$V_2 = V_Z + V_{in} \qquad (11)$$

Figure 14:
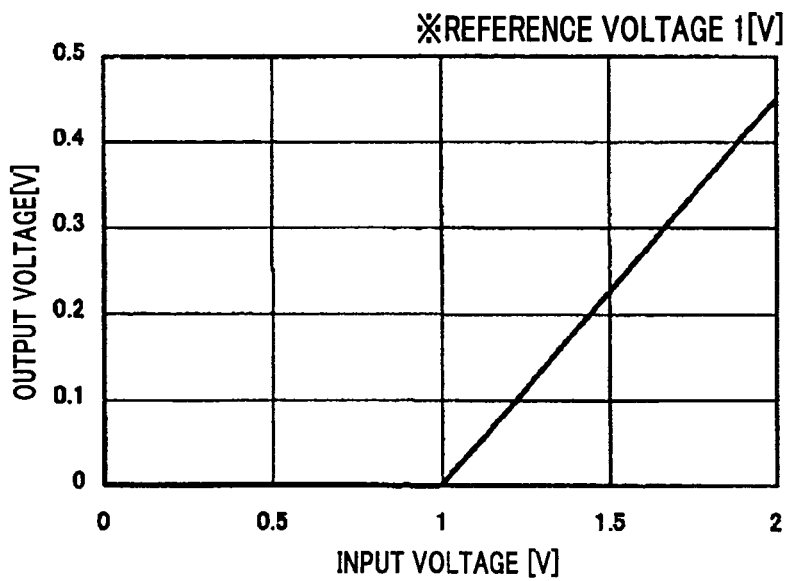
FIG. 14 is a graph showing an input-output characteristic of another subtraction device under the condition in FIG. 13.

The input-output characteristic of the subtraction device 73 in this case is illustrated in FIG. 14. In this case, when the difference between the input vector voltage $V_{in}$ and the reference vector voltage $V_{ref}$ is positive, the output voltage increases proportionally.

Figure 15:
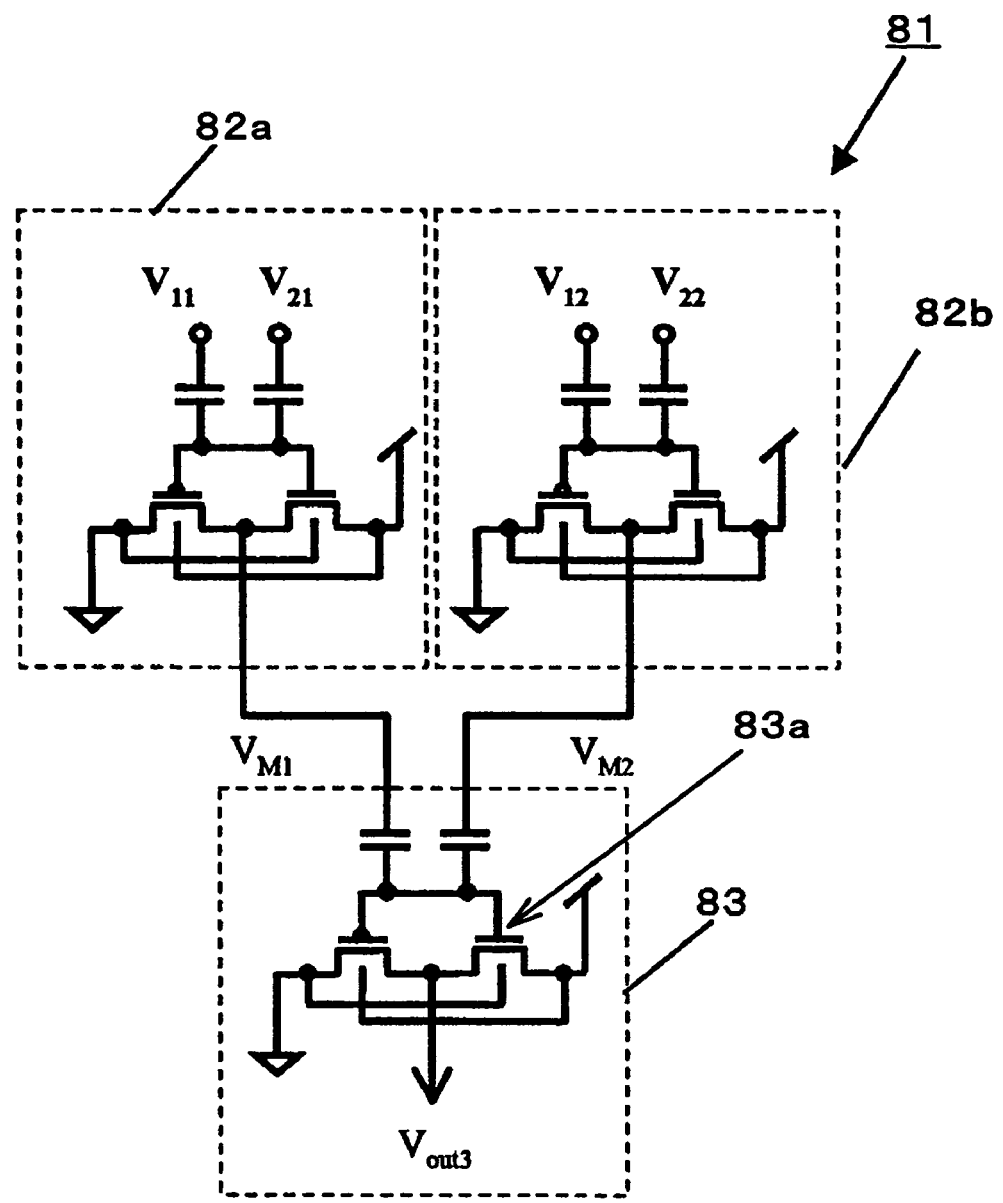
FIG. 15 is a circuit diagram showing a configuration of a circuit for calculating an absolute value using a characteristic of the subtraction device in FIGS. 13 and 14.

FIG. 15 shows a circuit configured to operate an absolute value utilizing the above characteristic. In FIG. 15, reference numeral 81 denotes a subtracter. The subtracter 81 is configured such that a pair of subtraction devices 82*a* and 82*b* are arranged in parallel. The outputs of the subtraction devices 82*a* and 82*b* are input to the adder 83. The subtraction devices 82*a* and 82*b* are constituted by the subtraction devices in FIG. 11.

When the inputs to the subtraction device 82*a* are $V_{11}$ and $V_{21}$, the inputs to the subtraction device 82*b* are $V_{12}$ and $V_{22}$, $V_{11}$ and $V_{12}$ are determined by the formulae (5) and (6), respectively, and $V_{21}$ and $V_{22}$ are determined by the formulae (10) and (11), respectively, the input-output characteristic of the processor 82*a* and the input-output characteristic of the processor 82*b* are those shown in FIGS. 13 and 14, respectively. The adder 83 outputs the voltage $V_{out3}$ proportional to the sum of the input voltages $V_{M1}$ and $V_{M2}$ according to the formula (4) and the characteristic of the source follower circuit 83*a*. The distance calculator 43 in FIG. 4 is constituted by the subtracter 81.

Figure 16:
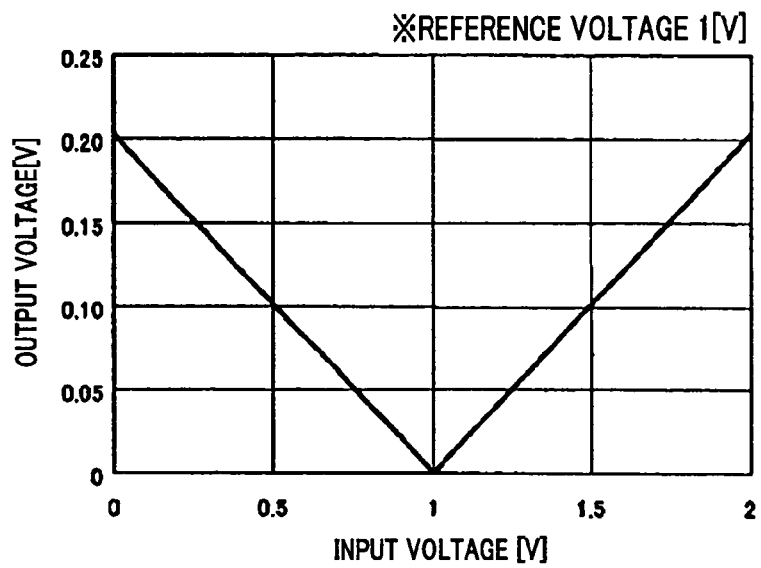
FIG. 16 is a graph showing an input-output characteristic of the distance calculator in FIG. 4.

FIG. 16 is a graph showing the input-output characteristic of the distance calculator 43 in FIG. 4. As shown in FIG. 16, the distance calculator 43 is capable of outputting the voltage proportional to the absolute value of difference between the reference vector voltage and the input vector voltage.

The distance calculator 43 requires two systems to allow the output of the input voltage output unit 13 in FIG. 4 and the output of the data storage portion 41 to be input to the subtraction device 82*a* and the subtraction device 82*b*, respectively, but these are omitted in FIG. 4.

Figure 17:
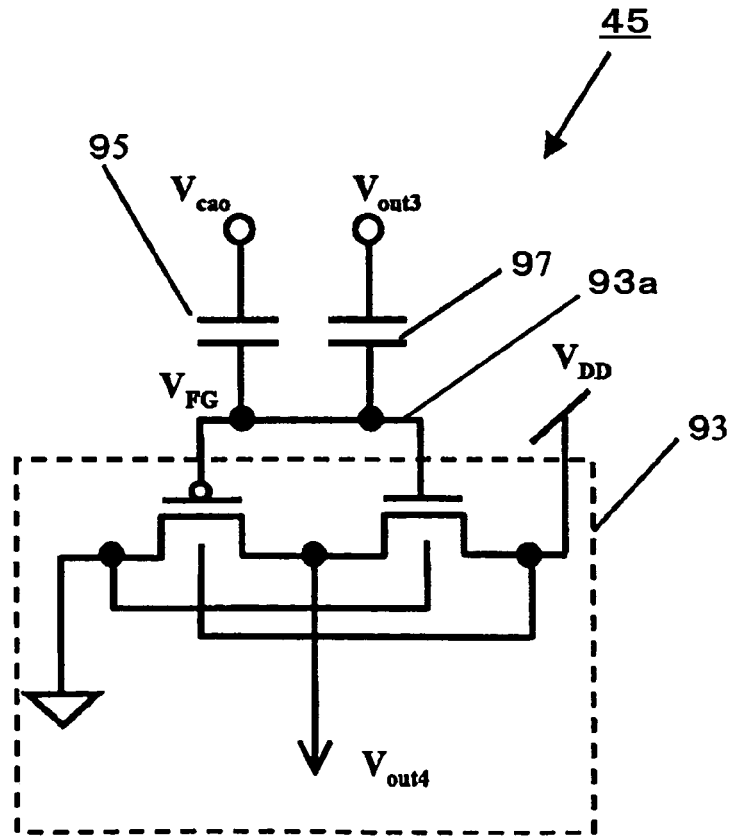
FIG. 17 is a circuit diagram showing an example of a configuration of an adder in FIG. 4.

FIG. 17 is a circuit diagram showing an example of a configuration of the adder 45 in FIG. 4.

As shown in FIG. 17, the adder 45 comprises a source follower circuit 93, and a first capacitor 95 and a second capacitor 97 connected in parallel to a gate electrode (floating gate electrode) 93*a* of the CMIS forming the source follower circuit 93. An output $V_{out3}$ of the distance calculator 43 (hereinafter referred to as a distance voltage) is input to the first capacitor 95. An output voltage $V_{cao}$ of the fluctuation generator 15 (hereinafter referred to as a fluctuation voltage) is input to the second capacitor 97.

An operation of the adder 45 is basically similar to that of the adder 83 in FIG. 1. In addition, since addition of the fluctuation voltage $V_{cao}$ and the distance voltage $V_{out3}$ is carried out in analog, the output $V_{out4}$ with fluctuation superposed on the distance voltage $V_{out3}$ is obtained.

Figure 18:
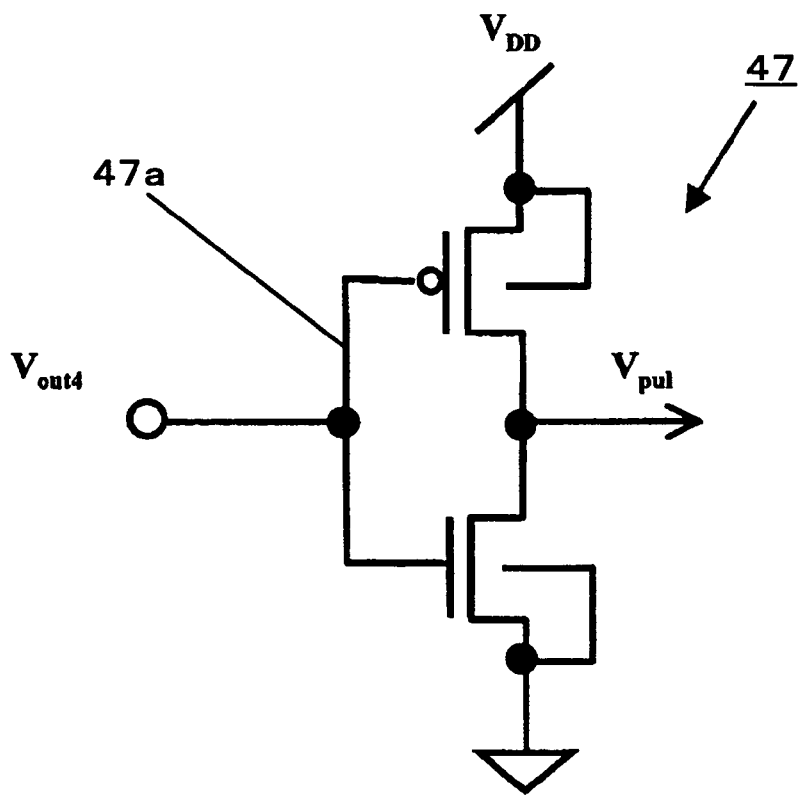
FIG. 18 is a circuit diagram showing an example of a configuration of a thresholding unit in FIG. 4.

FIG. 18 is a circuit diagram showing an example of a configuration of the thresholding unit 47 in FIG. 4.

As shown in FIG. 18, in this embodiment, as the thresholding unit 47, a CMIS inverter is used, for example.

In the thresholding unit 47, the output $V_{out4}$ of the adder 23 is input to the gate 47*a* of the CMIS inverter. The CMIS inverter inverts and amplifies the output $V_{out4}$ of the adder 45 while it is not less than a threshold voltage. Since the output $V_{out4}$ of the adder 45 is obtained by superposing the fluctuation voltage $V_{cao}$ having a fluctuation waveform on the distance voltage $V_{out3}$ having a flat waveform, the CMIS inverter outputs a pulse voltage $V_{pul}$.

Subsequently, an operation of the stochastic processor 1 configured as described above will be described.

Referring to FIGS. 1, 4, and 6, a predetermined number of columns (here, 1000 columns) of digital reference vector data is converted into analog data by the Operation • D/A converter 53 for each element and written to the data storage portions 41 of the stochastic processing circuits Cc1 to Ccn of the vector column comparison circuits Cp1 to Cpn as reference vector voltages $V_{ref}$, respectively. In the data storage portion 41, the analog data is subjected to predetermined operation in the data storage portion 41 and output to the distance calculator 43. Meanwhile, the digital input vector data is converted into analog input vector voltage $V_{in}$ by a D/A converter (not shown) and is subjected to a predetermined operation by the input voltage output circuit 13, and the resulting analog data is output to the distance calculator 43.

The distance calculator 43 operates an absolute value of difference (Manhattan distance between the element of the reference vector and the element of the input vector) between the reference vector voltage $V_{ref}$ and the input vector voltage $V_{in}$ based on these input voltages and outputs the absolute value to the adder 45 as the distance voltage $V_{out3}$.

The adder 45 adds the distance voltage $V_{out3}$ and the fluctuation voltage $V_{cao}$ input from the fluctuation generator 15 and outputs the voltage $V_{out4}$ with the fluctuation voltage $V_{cao}$ superposed on the distance voltage $V_{out3}$ to the thresholding unit 47.

The thresholding unit 47 performs thresholding on the output voltage $V_{out4}$ of the adder 45 and outputs the pulse voltage $V_{pul}$.

The pulse voltage $V_{pul}$ output from each stochastic processing circuit Cc is counted by the counter Ct for each vector column comparison circuit Cp, and the count is detected by the count obtaining unit 19 or the flag detector 17. Based on the detection result, degree of approximation between each reference vector data and the input vector data is judged.

Subsequently, the relationship between the number of pulses output from the thresholding unit 47 and the degree of approximation between the reference vector data and the input vector data, will be described in detail.

When the value of the reference vector voltage $V_{ref}$ is close to the value of the input vector $V_{in}$, the output of the distance calculator 43 has a small voltage, so that the output voltage $V_{out4}$ with the fluctuation of the adder 45 superposed thereon oscillates in a small voltage range. As a result, the output of the inverter as the thresholding unit 47 tends to be High level (=$V_{DD}$). With the above circuit configuration, as the value of the reference vector data is closer to the value of the input vector data, High, i.e., pulse is output more easily.

Figure 19:
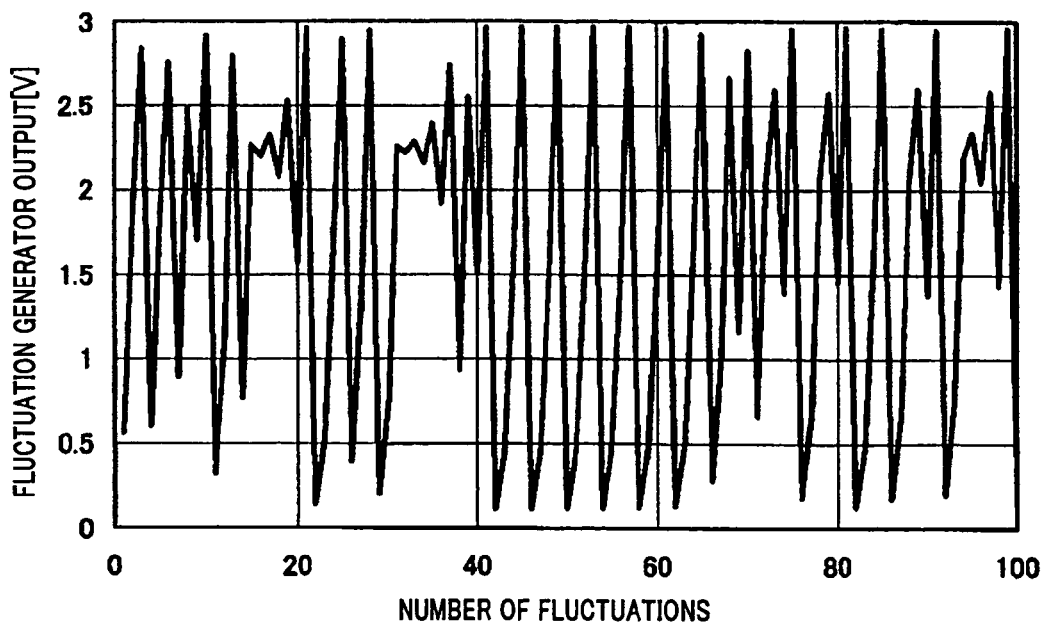
FIG. 19 is a graph showing an output of the fluctuation generator in FIG. 1.

FIG. 19 is a graph showing the output of the fluctuation generator 15 in FIG. 1. An abscissa axis represents the number of fluctuations.

As shown in FIG. 19, the output of the fluctuation generator 15 apparently generates random and chaos fluctuation.

Figure 20:
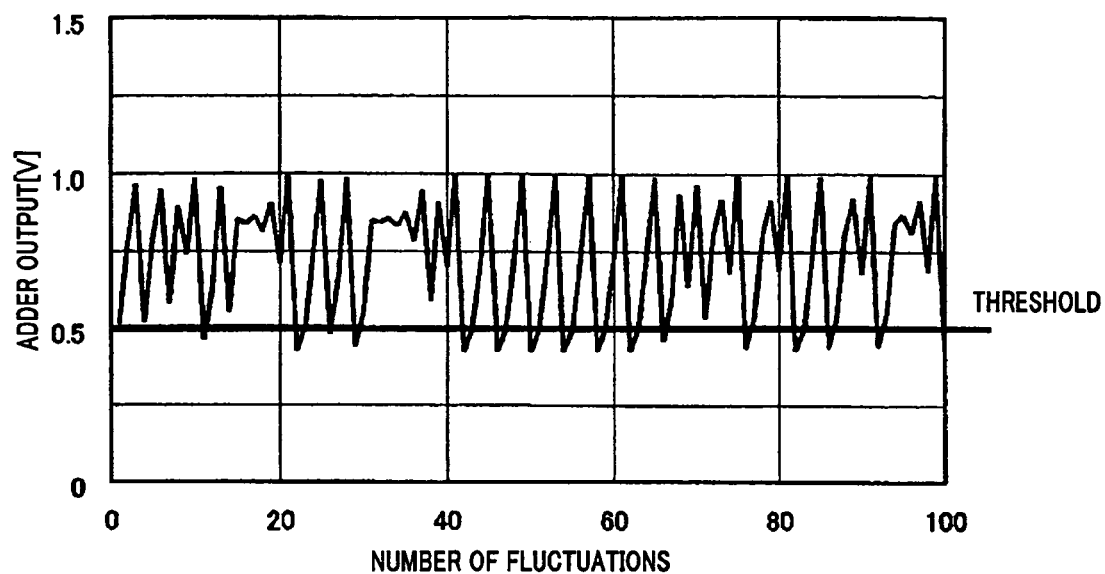
FIG. 20 is a graph showing part of an output of the adder with a difference between a reference vector voltage and a vector voltage being relatively large.

FIG. 20 is a graph showing a partial output of the adder 45 in the case where the difference between the reference vector voltage and the input vector voltage is relatively large (approximately 1.5[V]).

Figure 21:
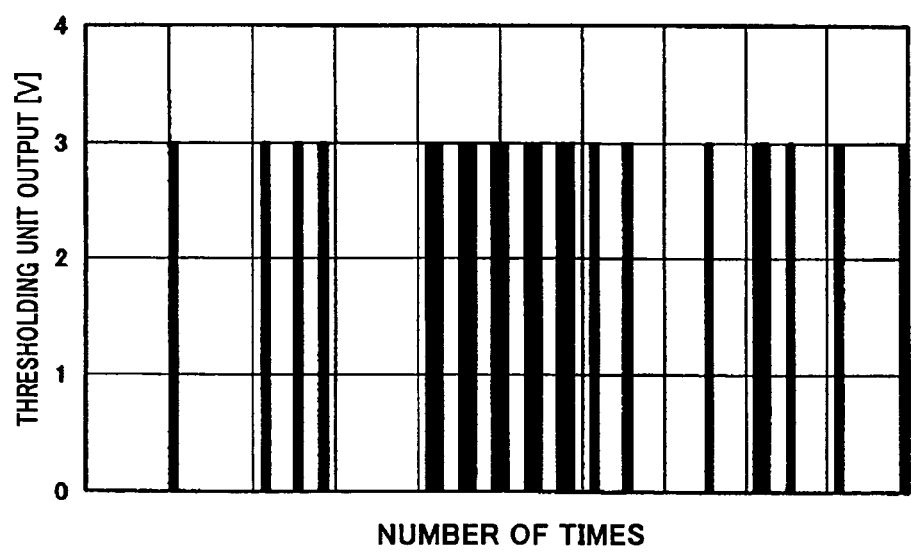
FIG. 21 is a graph showing an output of the thresholding unit with the output in FIG. 20 being input from the adder.

In this case, the output of the adder 45 is further, for example, binarized by the thresholding unit 47 (in this case, threshold voltage=0.5 [V]), thereby obtaining the output in FIG. 21. That is, the pulse is generated every time the output of the adder 45 crosses the threshold.

Figure 22:
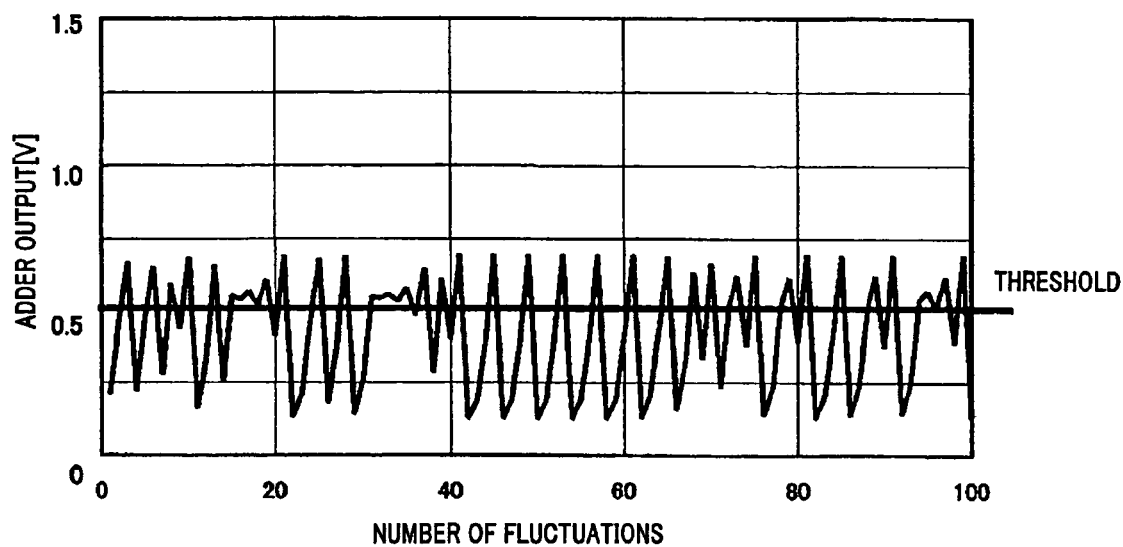
FIG. 22 is a graph showing part of an output of the adder with the difference between the reference vector voltage and the vector voltage being relatively small.
Figure 23:
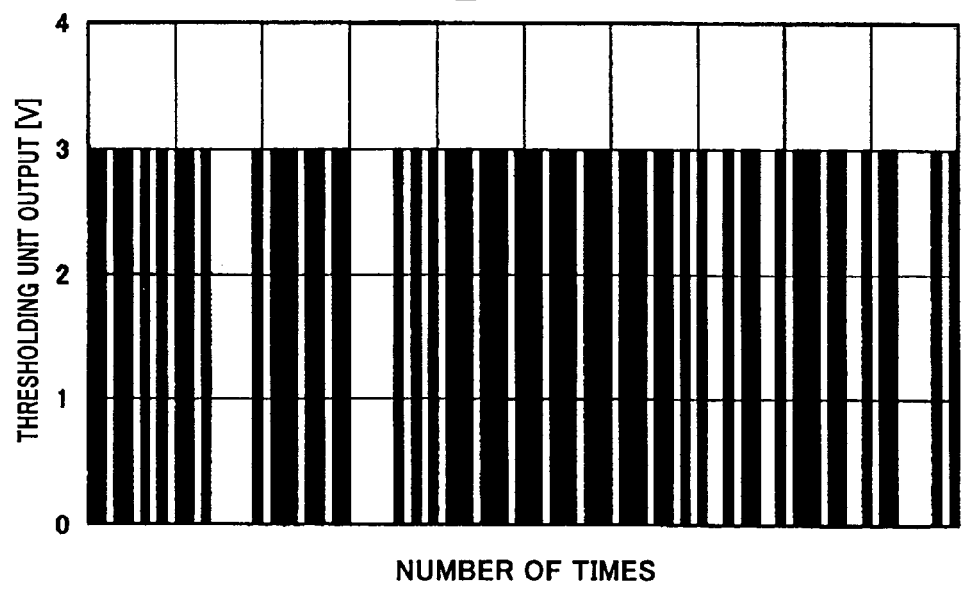
FIG. 23 is a graph showing an output of the thresholding unit with the output in FIG. 22 being input from the adder.

FIG. 22 is a graph showing a partial output from the adder 45 in the case where difference between the reference vector voltage and the input vector voltage is small (approximately 0.8 [V]). In FIG. 23, the output from the thresholding unit 45 is shown. From comparison between FIG. 21 and FIG. 23, it is found that the thresholding unit 47 has a characteristic in which more pulses are generated as the absolute value of difference between the reference vector voltage and the input vector voltage is smaller.

Figure 24:
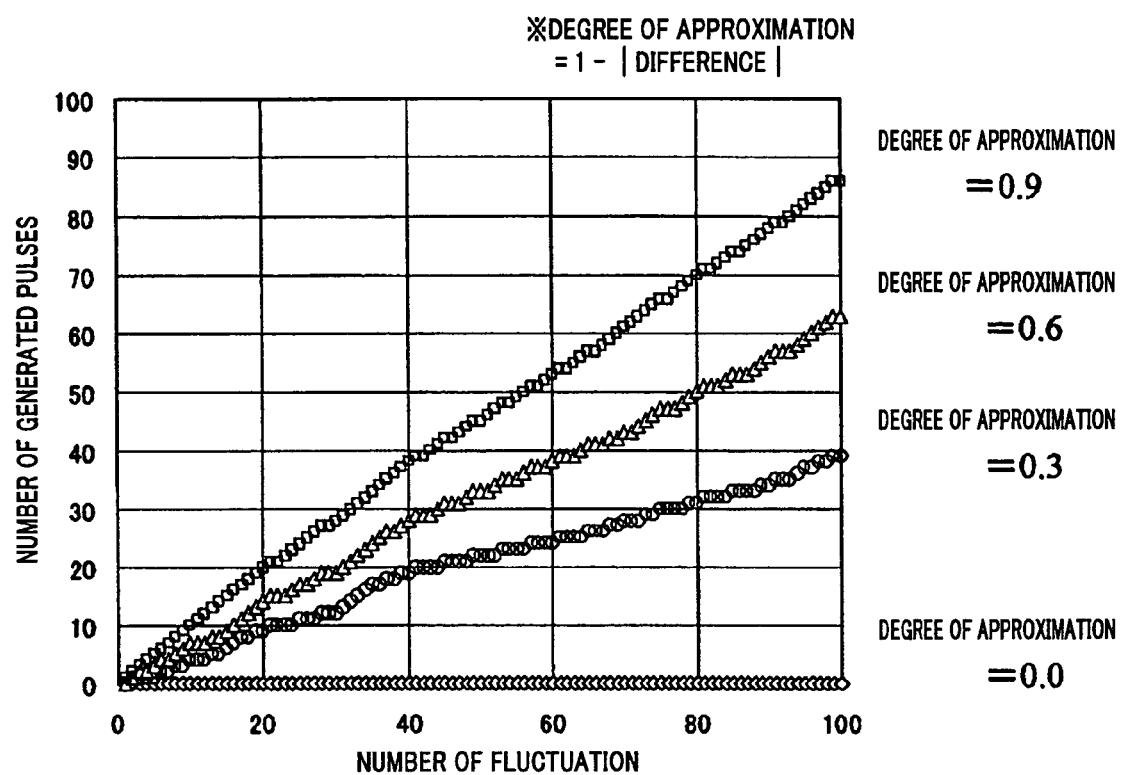
FIG. 24 is a graph showing the number of generated pulses relative to the number of fluctuations in a fluctuation voltage, by using degrees of approximation between reference vector data and input vector data as parameters.

This characteristic is intensively studied and the result is shown in FIG. 24.

FIG. 24 is a graph showing the number of generated pulses with respect to the number of fluctuations in the fluctuation voltage $V_{cao}$, by using the degree of approximation between the reference vector data and the input vector data as parameters.

As shown in FIG. 24, the degree of approximation is defined as the value obtained by subtracting an absolute value of difference between the reference vector voltage and the input vector voltage normalized by a power supply voltage from one. That is, the higher the degree of approximation is, the corresponding vectors resemble each other.

As shown in FIG. 24, for example, when the degree of approximation is zero, the threshold is not crossed, so that the number of pulses is zero with respect to 100 fluctuations. However, it should be understood that probability of generation of pulses increases as the degree of approximation increases. Since the pulse generation occurs stochastically, linear increase is not exhibited. However, it should be understood, with an increase in the number of fluctuations, the difference due to the degree of approximation is correspondingly stabilized.

This fluctuation and stochastic pulse generation due to thresholding are essential factors of the stochastic processor of the present invention. The stochastic processor lacks strictness of the conventional computer, but with an increase in the number of fluctuations, precision is improved stochastically. This means that it is possible to provide a novel device capable of performing difference calculation of vectors very flexibly in data processing that requires a quick operation result with low precision or when the operation time becomes long for gaining higher precision.

Subsequently, a driving method of the stochastic processor 1 of this embodiment in the case where the columns of the vector column comparison circuits Ct are fewer relative to the columns of vectors, i.e., the number of the vector column comparison circuits Ct is smaller relative to the number of the columns of vectors, will be described. Since the area of the stochastic processor 1 is finite, while declaration of matrix on software is virtual, such situation might frequently occur.

For example, in this embodiment, the number of vector columns is 1000. A case where 100 reference vectors closest to the input vector will be extracted by comparing vectors of 5000 columns, will be described.

In FIGS. 1, 4, and 6, first of all, reference vectors of 1000 columns are stored on the stochastic processor 1 as described with reference to FIG. 6. In this case, the reference vector data is sequentially written through the operation • D/A converter 53.

Then, the input vector is input, and thereafter, the fluctuation voltage is input from the fluctuation generator 15, thereby causing the pulses to be sequentially output from the thresholding unit 47. The pulses are sequentially counted by the counters Ct1 to Ctm. In the case of an output from Ds in FIG. 3, upon 256 (=$2^8$) pulses being input, $D_8$ line outputs High. The vector columns with High are monitored by the flag detector 17, and when the number of the vector columns with High has reached 100, the output of the fluctuation voltage from the fluctuation generator 15 is stopped. Subsequently, 900 columns of the reference vectors are written to the vector columns other than the vector columns whose outputs are High.

By repeating the above operation, the reference vector column closest to the input vector can be finally extracted.

As described above, the stochastic processor 1 of this embodiment is capable of a number of vector comparison operations in parallel, the comparison speed is by far higher than that of the conventional computer with increasing vectors.

In addition, a general analog circuit has difficulty in performing strict operation, but the stochastic processor 1 is on the premise that the operation principle is basically stochastic. Therefore, the stochastic processor 1 can be designed freely and fabricated easily.

In accordance with this embodiment, since the stochastic processor 1 can be constituted by existing circuit constituents such as a transistor or a capacitor, this can be fabricated by a semiconductor process technology.

In addition, the Manhattan distance can be calculated.

Further, the difference (distance) for each element between the reference vector and the input vector is output as the pulse, and based on the sum of pulses, the degree of approximation between the reference vector and the input vector is judged. Therefore, even when the elements of vectors to be compared are increased, the degree of approximation can be easily judged.

In summary, the stochastic processor 1 can offer a processor according to a new operation method, which is neither the conventional digital operation nor analog operation.

The present invention is unsuitable for strict logical operation, but is capable of vector matching frequently occurring in recognition process at very high speeds. So, the present invention can offer very useful device capable of assisting the conventional semiconductor device.

While each circuit is configured such that a plurality of capacitors are connected to the gate of the source follower circuit in this embodiment, a desired operation is obtained so long as the device is capable of performing similar operation, as a matter of course.

As described previously, chaos is not necessarily used as the fluctuation, and the chaos is not intended to be limited to logistic chaos, but the same effects are expected to be produced provided that a method capable of gaining uniform probability during a long period of time, is employed.

While in this embodiment, the D flip-plop is used as the counter, but another counter may be used.

While the ferroelectric is used as the analog memory, the similar effects can be produced by using analog quantities as physical properties. For example, resistance variation of a phase-change material, or charging to the capacitor may be employed.

While the thresholding process is performed in a simple inverter, this may be performed in another circuit.

While the voltage is used as the physical quantities of analog representing data of the reference vector data and the input vector data, other physical quantities, for example, a current may be used.

Embodiment 2

Figure 25:
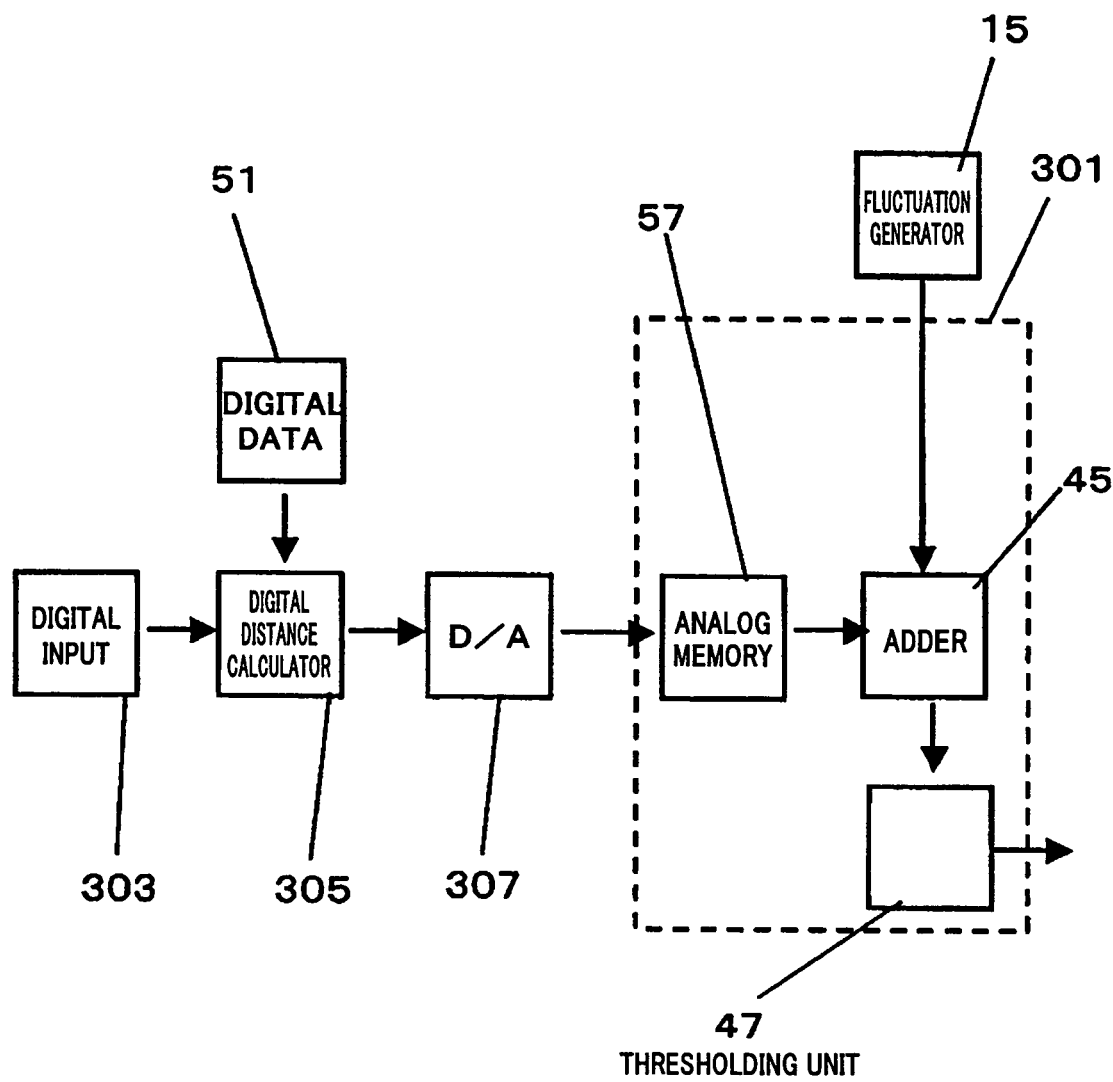
FIG. 25 is a block diagram showing a configuration of a stochastic processing circuit of a stochastic processor according to a second embodiment of the present invention.

FIG. 25 is a block diagram showing a stochastic processing circuit of a stochastic processor according to a second embodiment of the present invention. In FIG. 25, the same reference numerals as those in FIG. 4 denote the same or corresponding parts, which will not be further described.

As shown in FIG. 25, the stochastic processor of this embodiment differs from that of the first embodiment in that a digital circuit performs operation from input of the input vectors to distance calculation between vector elements. A stochastic processing circuit 301 corresponds to the stochastic processing circuit Cc of the first embodiment. In other respects, the second embodiment is identical to the first embodiment.

Specifically, digital input vector data 303 is input to a digital distance calculation circuit 305. For example, the digital distance calculation circuit 305 calculates an absolute value of the distance between the element of the reference vector and the element of the input vector using the digital input vector data 303 and the digital reference vector data 51. The calculation result is converted into analog data by the D/A converter 307 and stored in the analog memory 57. The analog output of the analog memory 57 is superposed on the output of the fluctuation generator 15 by the adder 45, and the resulting output is subjected to thresholding by the thresholding unit 47 and is output as pulses. Thus, the operation is carried out as in the first embodiment.

The stochastic processor of this embodiment requires time to calculate the difference in digital, but the distance calculator 43 in FIG. 4 is omitted. As shown in FIG. 6, the distance calculators 43 are arranged in matrix, while the distance calculation circuit 305 of this embodiment is arranged for each row, which makes it possible to reduce a chip area.

Furthermore, by incorporating functions of the digital distance calculation circuit 305 and the D/A converter 307 of the second embodiment into the Operation • D/A converter 53 in FIG. 6, a number of distance calculations are carried out in parallel in a vector element direction, and analog data of distance is written to the analog memory 57 in matrix. Therefore, a stochastic processor with an extremely high area efficiency is achieved.

Embodiment 3

Figure 26:
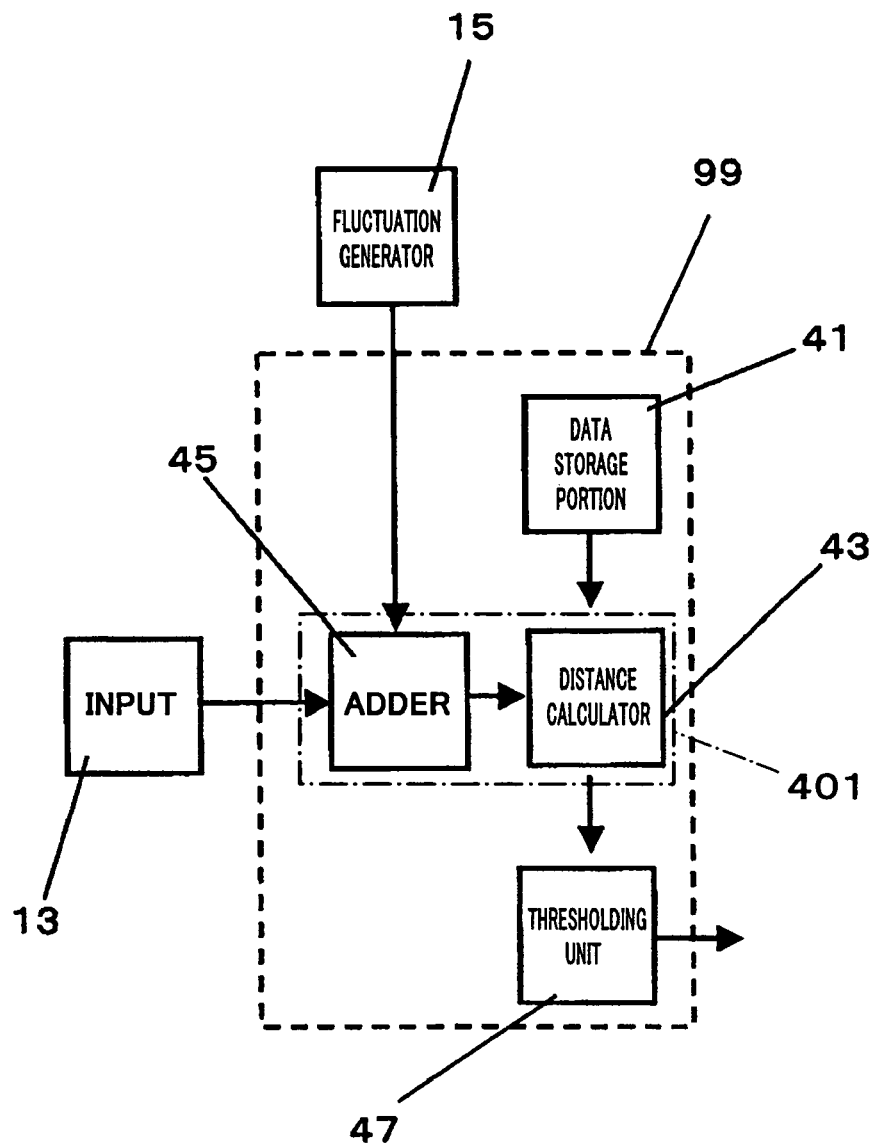
FIG. 26 is a block diagram showing a configuration of a stochastic processing circuit of a stochastic processor according to a third embodiment of the present invention.

FIG. 26 is a block diagram showing a stochastic processing circuit of a stochastic processor according to a third embodiment of the present invention. In FIG. 26, the same reference numerals as those in FIG. 4 denote the same or corresponding parts, which will not be further described.

As shown in FIG. 26, a stochastic processing circuit 99 of the third embodiment differs from that of the first embodiment in that a distance between the input vector voltage with the fluctuation voltage superposed thereon and the reference vector voltage is calculated. In other respects, the third embodiment is identical to the first embodiment.

In such a operation order, the stochastic processor capable of generating pulses stochastically is achieved as in the first embodiment.

Embodiment 4

Figure 27:
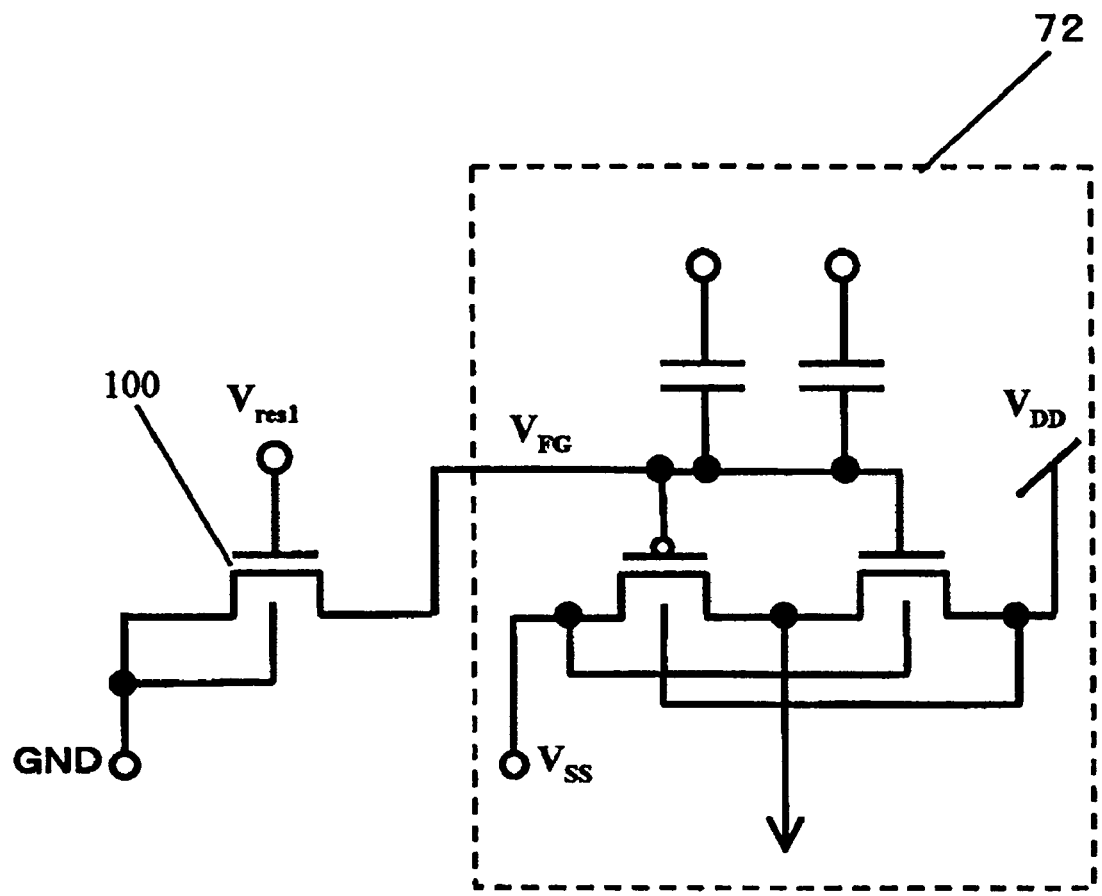
FIG. 27 is a circuit diagram showing an example of a configuration of a subtraction device of a stochastic processor according to a fourth embodiment of the present invention.

FIG. 27 is a circuit diagram showing an example of a configuration of a subtraction device of a stochastic processor according to a fourth embodiment of the present invention.

In FIG. 27, reference numeral 100 denotes a switching device. In the fourth embodiment, the subtraction device 72 of the first embodiment is further provided with the switching device 100 on the gate electrode of the source follower circuit. One end of the switching device 100 is connected to the gate electrode and the other end thereof is electrically grounded. In the same manner, in the fourth embodiment, the adder 45 and the analog memory 57 of the first embodiment are respectively further provided with switching devices on the gate electrodes of the source follower circuits. One ends of the switching devices are connected to the gate electrodes and the other ends thereof are electrically grounded. In such a configuration of the fourth embodiment, the potential of the floating electrode is, for example, once electrically grounded by applying a reset voltage $V_{res1}$ to the switching device 100, although the gate electrode of the source follower circuit of the first embodiment is not connected to the wire, i.e., in a floating state.

Thereby, charge remaining after a dry etching step in fabrication of the device can be removed. When the stochastic processor of this embodiment is used for a long period of time, charges flowing from the gate of the MISFET forming the source follower circuit can be removed.

In this configuration, when the MISFET is used for the switching device 100 for reset, the potential held in the floating electrode during operation is attenuated with a lapse of time due to so-called junction leak. However, the operation time of the stochastic processor of this embodiment is approximately one second at longest, and therefore, the operation is carried out without any problem.

Embodiment 5

Figure 28:
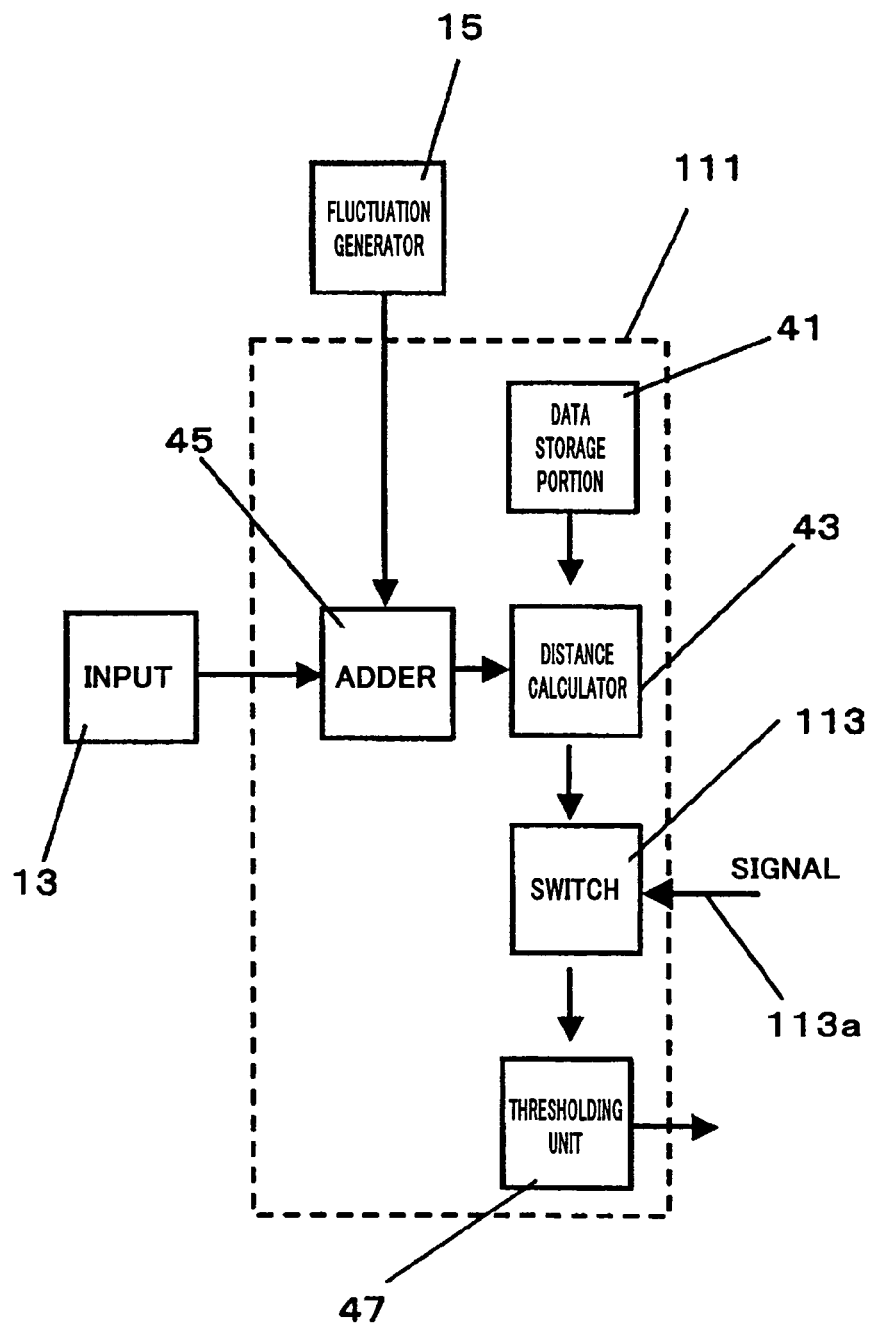
FIG. 28 is a block diagram showing a configuration of a stochastic processing circuit of a stochastic processor according to a fifth embodiment of the present invention.

FIG. 28 is a block diagram showing a stochastic processing circuit of a stochastic processor according to a fifth embodiment of the present invention. In FIG. 28, the same reference numerals as those in FIGS. 4 and 26 denote the same or corresponding parts, which will not be further described.

As shown in FIG. 28, in a stochastic processing circuit 111 of the third embodiment, a switch 113 is provided just before the thresholding unit 47. In other respects, the fifth embodiment is identical to the third embodiment.

As should be understood from an operation illustrated in FIG. 22, since the stochastic processor of the present invention generates pulses only when the voltage having fluctuation crosses a threshold, there is a possibility that the threshold is not crossed when the absolute value difference of vectors is extremely small.

Accordingly, in this embodiment, while the output signal 113a is not input to the switch 113, for example, High is output from the switch 113, whereas when the output signal 113a is input, the output from the distance calculator 43 is output from the switch 113. Thereby, the pulse can be generated by forcibly causing the output to cross the threshold even when the output from the distance calculator 43 is continuously low and therefore does not cross the threshold.

Embodiment 6

Figure 29:
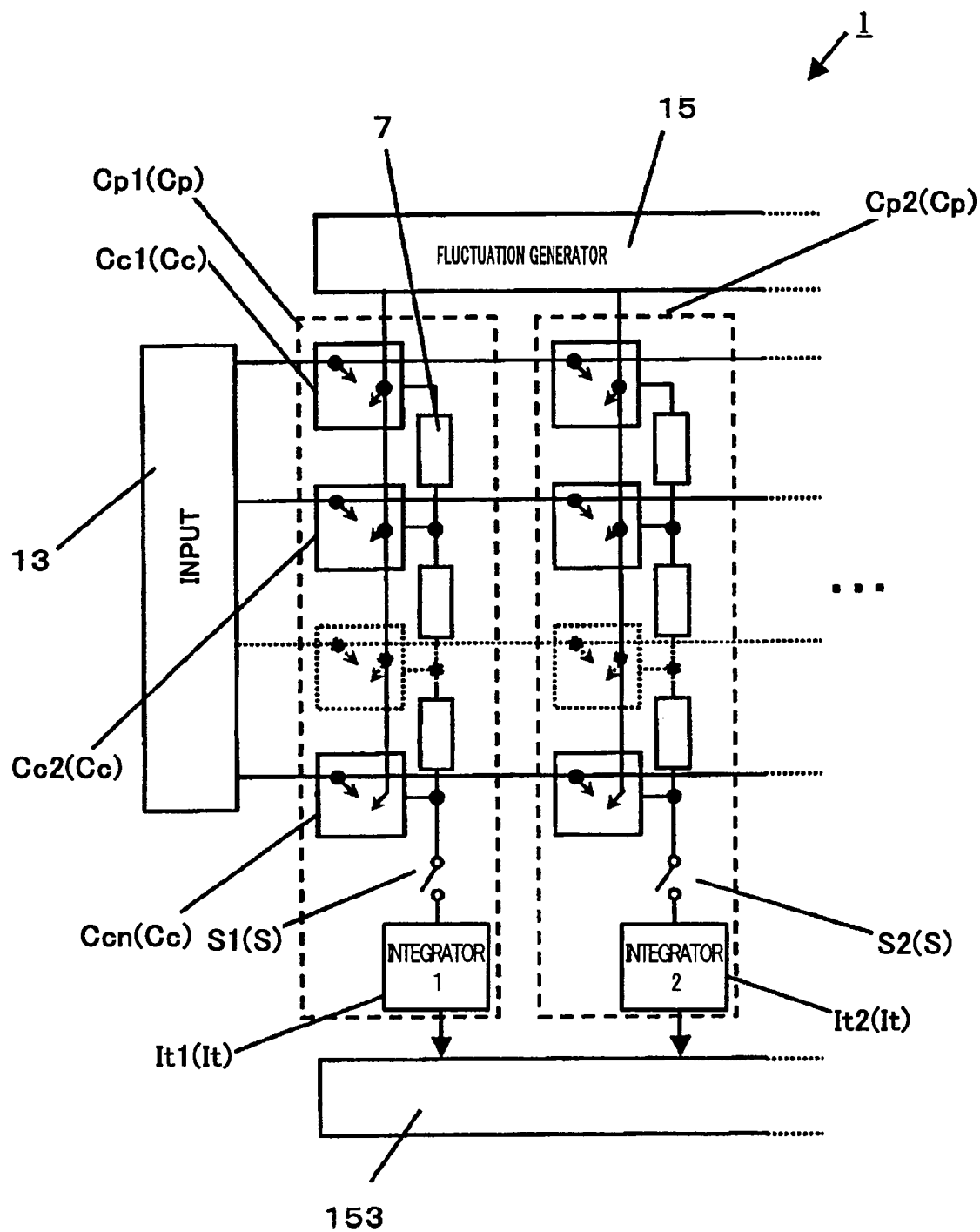
FIG. 29 is a circuit diagram showing a configuration of a stochastic processor according to a sixth embodiment of the present invention.

FIG. 29 is a circuit diagram showing a configuration of a stochastic processor according to a sixth embodiment of the present invention. In FIG. 29, the same reference numerals as those in FIG. 1 denote the same or corresponding parts, which will be not further described.

As shown in FIG. 29, in this embodiment, integrators It and a comparator 153 are provided instead of the counters Ct, the flag detector 17, and the count obtaining unit 19 of the first embodiment. Integrators It1 to Itm store charges contained in pulses which are output from the stochastic processing circuits Cc and output voltages according to the stored charges to the comparators 153. The comparator 153 compare the magnitudes of the output voltages of the integrators It1 to Itm1 and extracts the integrator It (and hence vector column) which outputs a voltage with a larger magnitude. In other respects, the sixth embodiment is identical to the first embodiment.

In accordance with such a configuration, as in the embodiment 1, the vector column that approximates the input vector can be extracted at a high speed among reference vectors. In addition, the pulses output from the stochastic processing circuits Cc are evaluated regarding their widths as well as the number of pulses, and based on the evaluation, the degree of approximation between the reference vector and the input vector is judged. Consequently, the degree of approximation can be judged more suitably.

Figure 30:
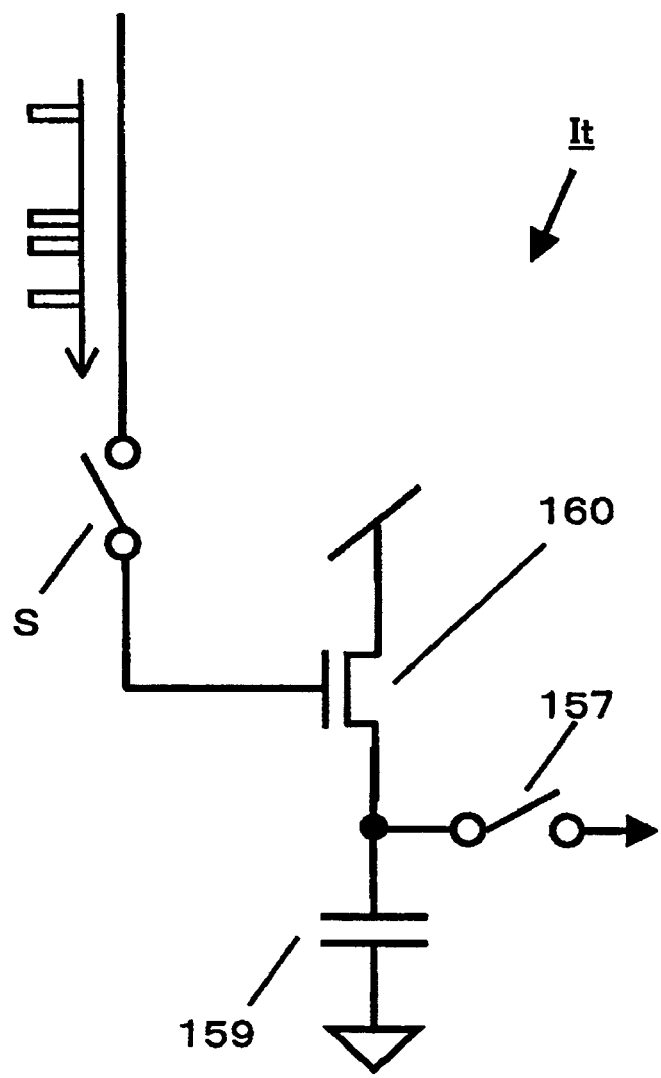
FIG. 30 is a circuit diagram showing a configuration of an integrator in FIG. 29.

An example of the configuration of the integrator It is shown in FIG. 30.

As shown in FIG. 30, the integrator It has a FET 160. The gate of the FET 160 is connected to the switch S in FIG. 29. On the other hand, a capacitor 159 is connected to the source of the FET 160, and a connection point between the source of the FET 160 and the capacitor 159 is connected to the comparator 153 through a second switch 157.

In the integrator It configured as described above, upon the pulses being transmitted to the wire with the switch S being in ON-state and the switch 157 being in OFF-state, ON/Off of the FET 160 is switched. While the FET 160 is ON-state, charges are stored on the capacitor 159. When the switch S is turned OFF and the switch 157 is turned ON, the voltage corresponding to the charge stored previously, is output to the comparator 153. In other words, the voltage corresponding to their widths and the number of pulses is output. In this case, the potential being stored becomes gradually non-linear with an increase in the amount of stored charge, but difference in magnitude can be accurately detected, and therefore, comparison between vector columns is sufficiently dealt with.

The stochastic processor of this embodiment is capable of carrying out comparison between vector columns with higher precision, because the data as pulse width can be stored when the fluctuation crossing the threshold is generated for a long period of time, as described in the fifth embodiment.

Embodiment 7

Hereinafter, a seventh embodiment of the present invention will be described.

Figure 31:
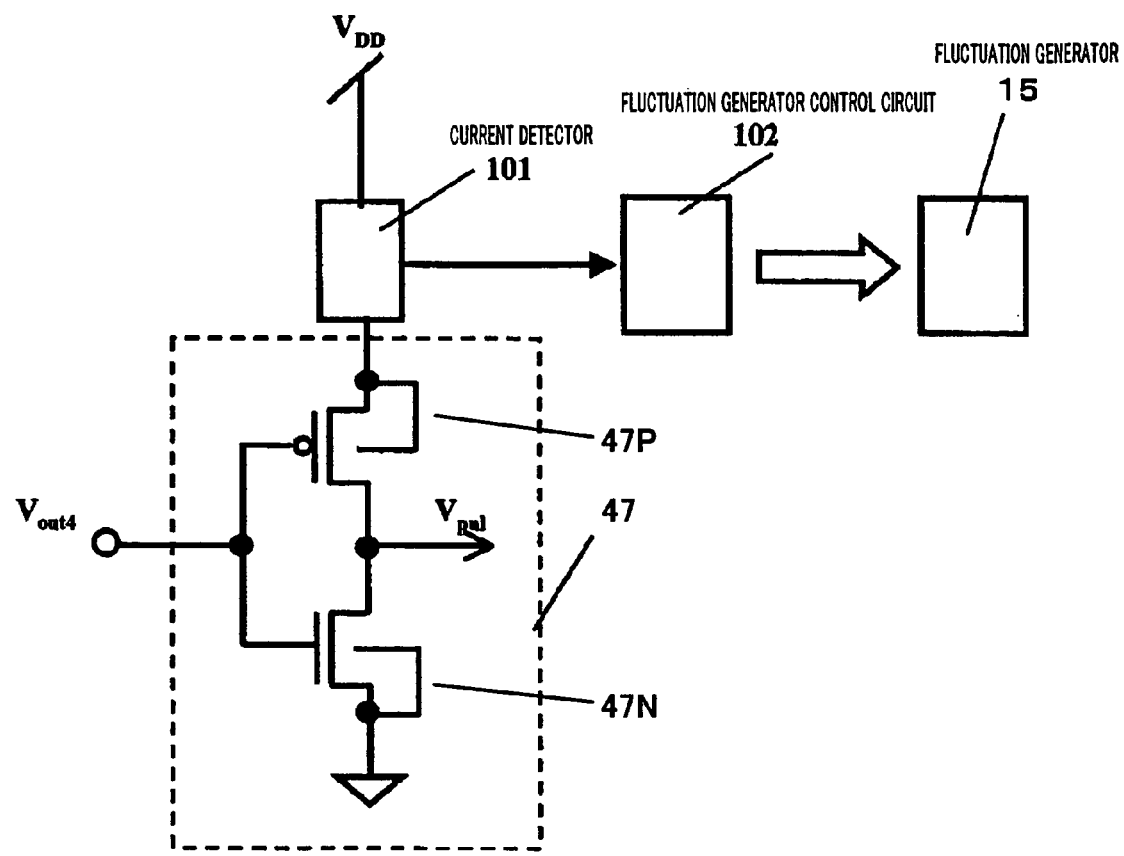
FIG. 31 is a circuit diagram showing a configuration of a thresholding unit of a stochastic processor according to a seventh embodiment of the present invention.

FIG. 31 is a circuit diagram showing a configuration of a thresholding unit of a stochastic processor according to a seventh embodiment of the present invention. In FIG. 31, the same reference numerals as those in FIG. 1 denote the same or corresponding parts, which will not be further described.

In FIG. 31, reference numeral 101 denotes a current detector and 102 denotes a fluctuation generator control circuit.

As already described in the fifth embodiment, in the stochastic processor of the present invention, generation of pulses is stopped and count is not increased, although the vectors are close to each other, when the difference between vectors is small and the threshold is not crossed for a certain period of time.

In order to avoid this, the stochastic processor of this embodiment is characterized in that an extent of fluctuation of a voltage or an average voltage of the fluctuation generator 15 is gradually increased.

The fluctuation generator control circuit 102 gradually increases the fluctuation of the output voltage of the fluctuation generator 15. In time, the fluctuation reaches the threshold, at which time point, pulses are generated frequently. Since thresholding unit 47 of this embodiment is constituted by the inverter, a through current flows from the PMIS 47P to the NMIS 47N at the moment when High/Low is inverted. Upon the current detector 101 detecting the through current, the fluctuation generator control circuit 102 judges that the pulses have started to be generated and maintains the extent of fluctuation of the voltage or the average voltage of the fluctuation generator 15 at a value at that point of time. Thereby, an excessive increase in fluctuation can be inhibited.

Figure 32:
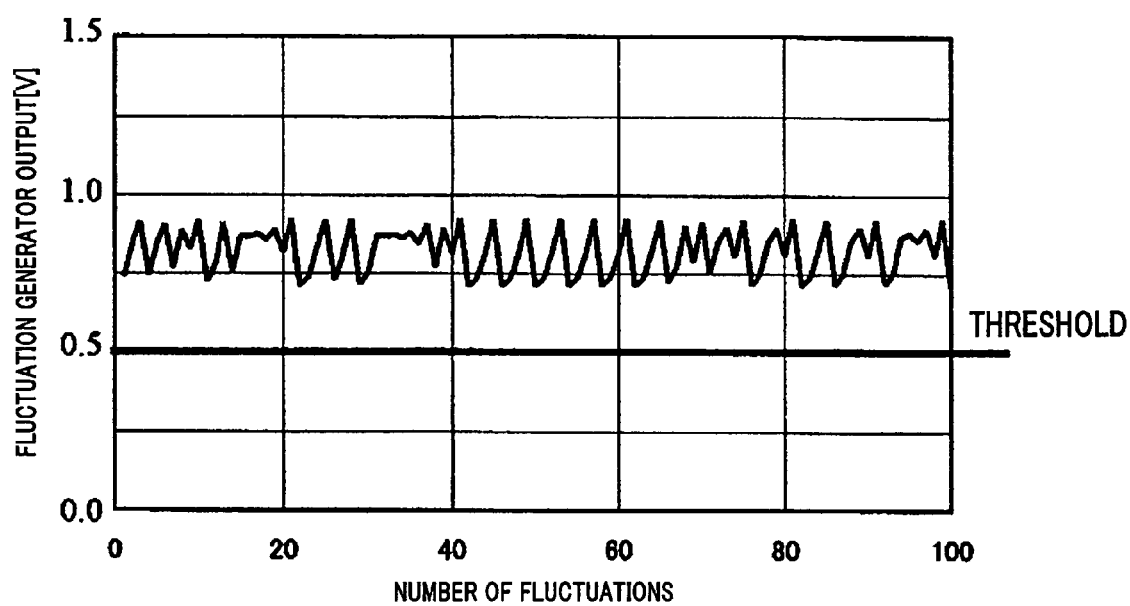
FIG. 32 is a graph showing an output of the fluctuation generator with a high bias voltage being added.
Figure 33:
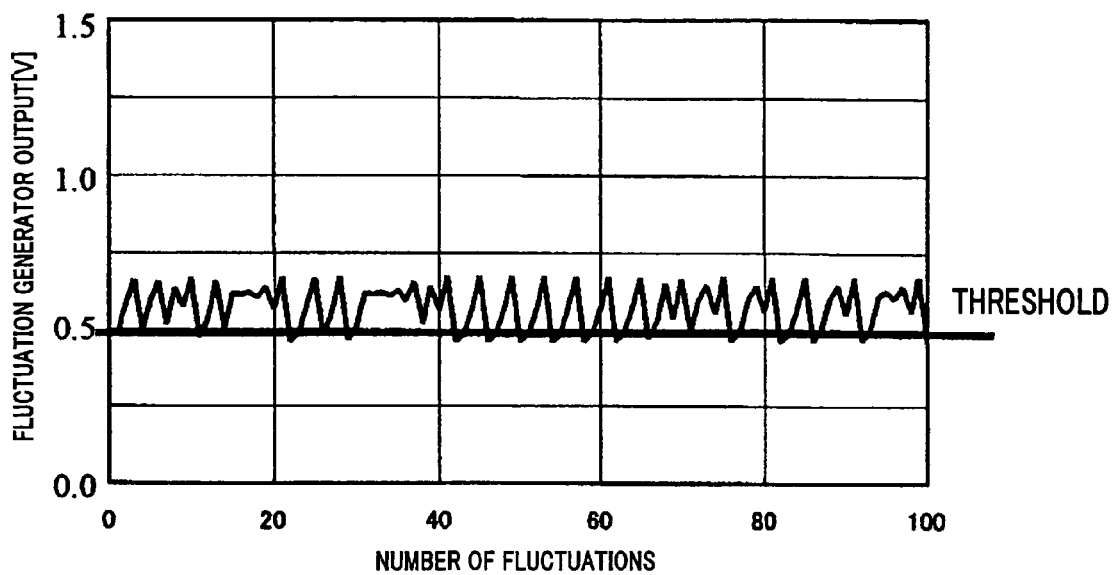
FIG. 33 is a graph showing an output of the fluctuation generator with the bias voltage being gradually decreased from the state in FIG. 32.

FIGS. 32 and 33 show this operation in detail. FIG. 32 shows a voltage input to the thresholding unit 47 with a high bias voltage (approximately 1[V]) being added in the fluctuation generator 15. In this case, since voltage fluctuates within a voltage range higher than 1[V] as the threshold, the voltage does not reach the threshold, and therefore no pulses are generated in the thresholding unit 47. That is, the inverter 47 continues to output Low level, and the through current observed in inversion does not vary.

FIG. 33 shows the voltage input to the thresholding unit 27 with the bias voltage being gradually decreased from the state in FIG. 32 to about 0.5[V]. In this case, the voltage fluctuation crossing the threshold frequently occurs, and therefore, a number of pulses are output as described above. By repeating On/Off of the inverter in this manner, the through current in the inverter is increased, which is detected by the current detector 101.

While such adjustment is performed in such a manner that the bias voltage is added to the fluctuation of the fluctuation generator 15 to cause the average output voltage to vary as described above, this may be performed by increasing the fluctuation with. Also in this configuration, the same effects are produced.

Embodiment 8

A stochastic processor according to an eighth embodiment of the present invention has a feature in fluctuation generated in the fluctuation generation circuit 15, and hereinbelow, the characteristic of the fluctuation will be described.

Figure 34:
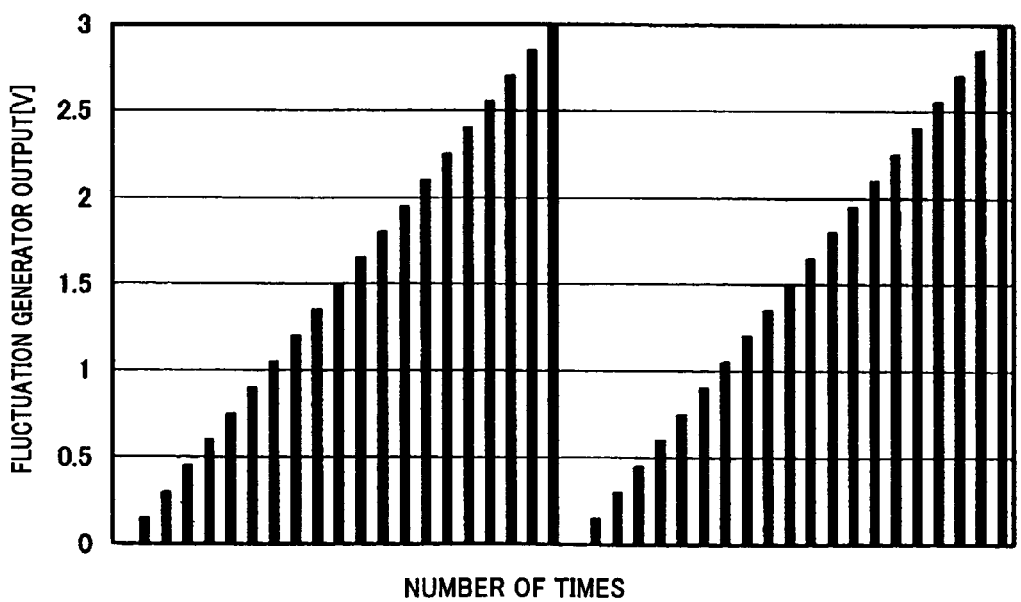
FIG. 34 is a graph showing an output of a fluctuation generator of a stochastic processor according to an eighth embodiment of the present invention.

FIG. 34 is a graph showing an output of the fluctuation generator of the stochastic processor according to this embodiment.

In the stochastic processor of the first to seventh embodiments, the operation is carried out using chaos or thermal noise as the output of the fluctuation generator. The stochastic processor carries out operations using the output exhibiting such random behavior.

The output of the fluctuation generator 15 of the eighth embodiment is regular as shown in FIG. 34. Here, the magnitude of the generated output is controlled so that a histogram of the output is made as equal as possible. The pulse train that gradually increases as shown in FIG. 34 is gained by sampling a voltage of a ramp waveform at certain time intervals.

With the use of such fluctuation voltage, the same effects as described in the first to seventh embodiments are produced.

The pulse train with voltage increasing regularly is used, but instead, by using an output which is not substantially biased in a histogram thereof, the same effects are also expected.

Embodiment 9

A ninth embodiment of the present invention shows an voice recognition device as a recognition processing device, using the stochastic processor of the first to eighth embodiments.

Figure 35:
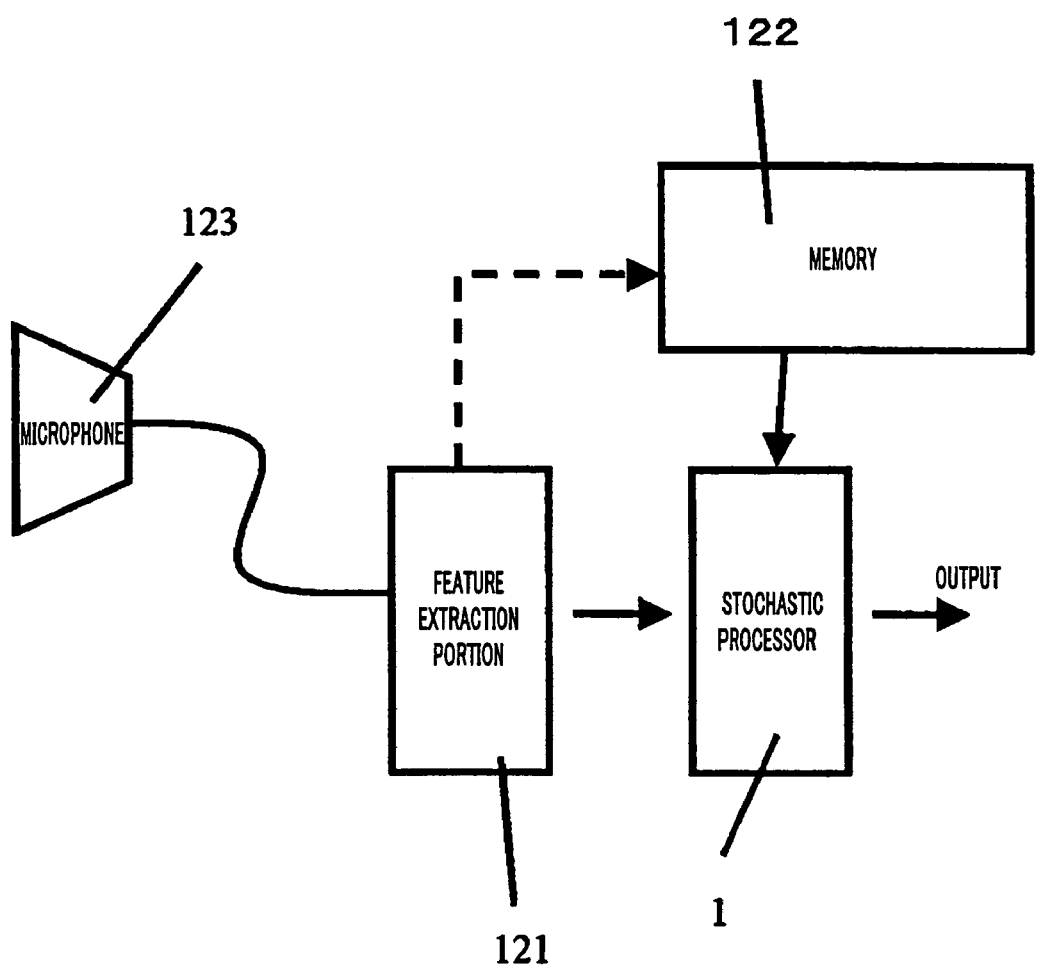
FIG. 35 is a block diagram schematically showing a configuration of a voice recognition device according to a ninth embodiment of the present invention.

FIG. 35 is a block diagram schematically showing a configuration of the voice recognition device according to the embodiment of the present invention. In FIG. 35, the same reference numerals as those in FIG. 1 denote the same or corresponding parts, which will not be further described.

As shown in FIG. 35, the voice recognition device comprises a microphone 123, a feature extraction portion 121 that extracts voice data input through the microphone 123, a memory 122 that stores a reference vector group, and a stochastic processor that compares feature data extracted by the feature extraction portion 121 to the reference vector data group stored in the memory 122, thereby recognizing a voice.

In the voice recognition device configured described above, the reference vector data group is stored in the memory 122 as, for example, digital data. As the reference vector group, basic feature data of voice is pre-stored and feature data obtained by the feature extraction portion 121 is stored as necessary. The feature extraction portion 121 performs processing such as spectrum distribution or time variation on analog voice data input through the microphone 123, thereby extracting feature data.

The feature data is input to the stochastic processor 1 as input vector. The stochastic processor 1 compares the feature data to the reference vector group and specifies the reference vector data closest to the input vector (vector matching), thus recognizing voice corresponding to the input feature data as the voice corresponding to the specified reference vector data.

Thereby, the voice input to the microphone 123 can be recognized at a very high speed. For example, when the voice input to the microphone 123 is Japanese, Japanese syllabary can be extracted.

Embodiment 10

A tenth embodiment of the present invention shows an improved configuration of the voice recognition device according to a ninth embodiment of the present invention.

Figure 36:
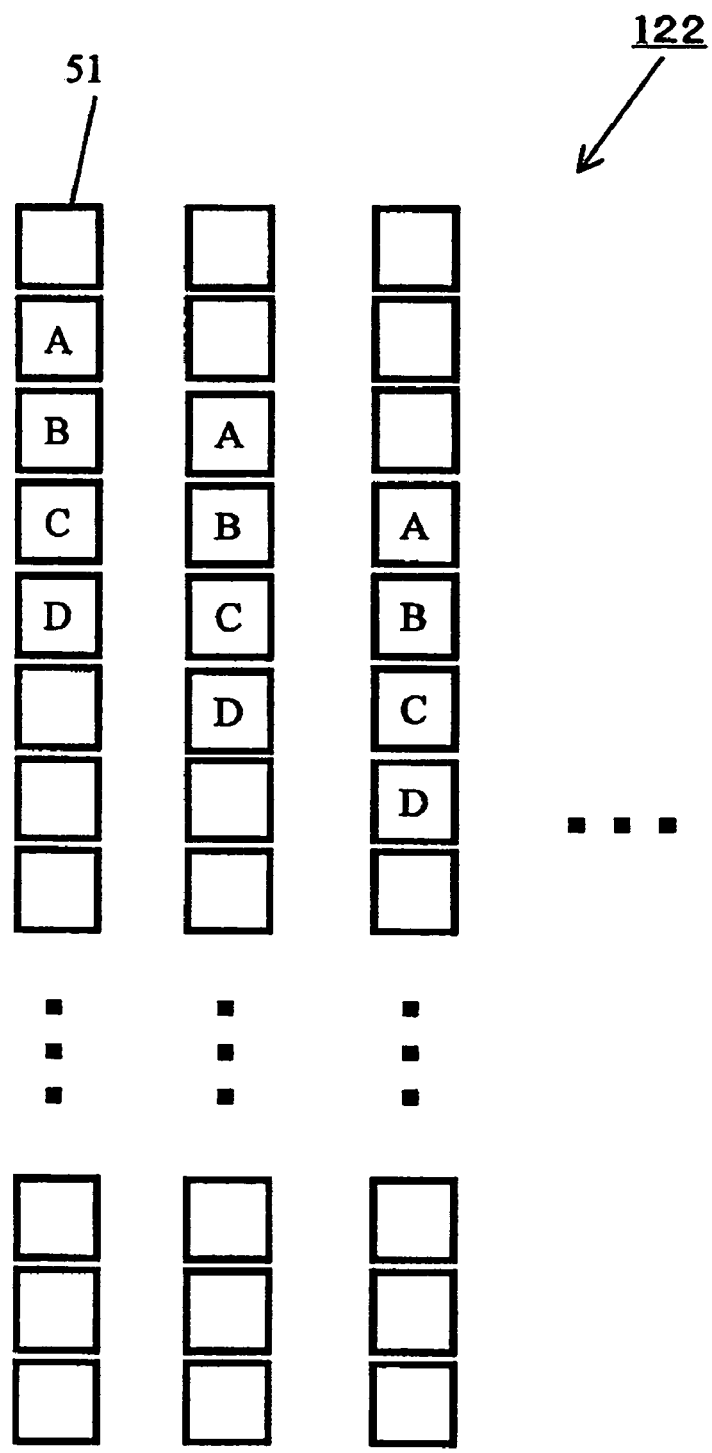
FIG. 36 is a view showing a feature of a reference vector data group stored in a memory of a voice recognition device according to a tenth embodiment of the present invention.

FIG. 36 is a view for explaining a feature of a reference vector data group stored in a memory of the voice recognition device according to this embodiment. In FIG. 36, the same reference numerals as those in FIG. 35 denote the same or corresponding parts, which will not be further described.

The voice recognition device of this embodiment is obtained by devising the reference vector group in the voice recognition device of the ninth embodiment.

More specifically, as shown in FIG. 36, reference vector data 51 of this embodiment has a data structure with spectrum data of voice arranged in time series from front. As shown in FIG. 36, alphabets A to D are described in part of the digital reference vector data 51 and represent feature data associated with the same voice.

The voice recognition device of this embodiment is characterized in that the same data is arranged to be shifted in the reference vector data group.

A speech made by a person is expressed as the same by means of characters. But, the speech is not always given by the person at the same timing, and varies from person to person.

Since the stochastic processor of the present invention is capable of performing matching of large amounts of vectors at very high speeds, it can be judged which of characters the input voice corresponds to, regardless of time expansion and compression, by shifting data in time in view of the time expansion and compression.

Embodiment 11

An eleventh embodiment of the present invention illustrates an image recognition device as the recognition process device using the stochastic processor of the first to eighth embodiments.

Figure 37:
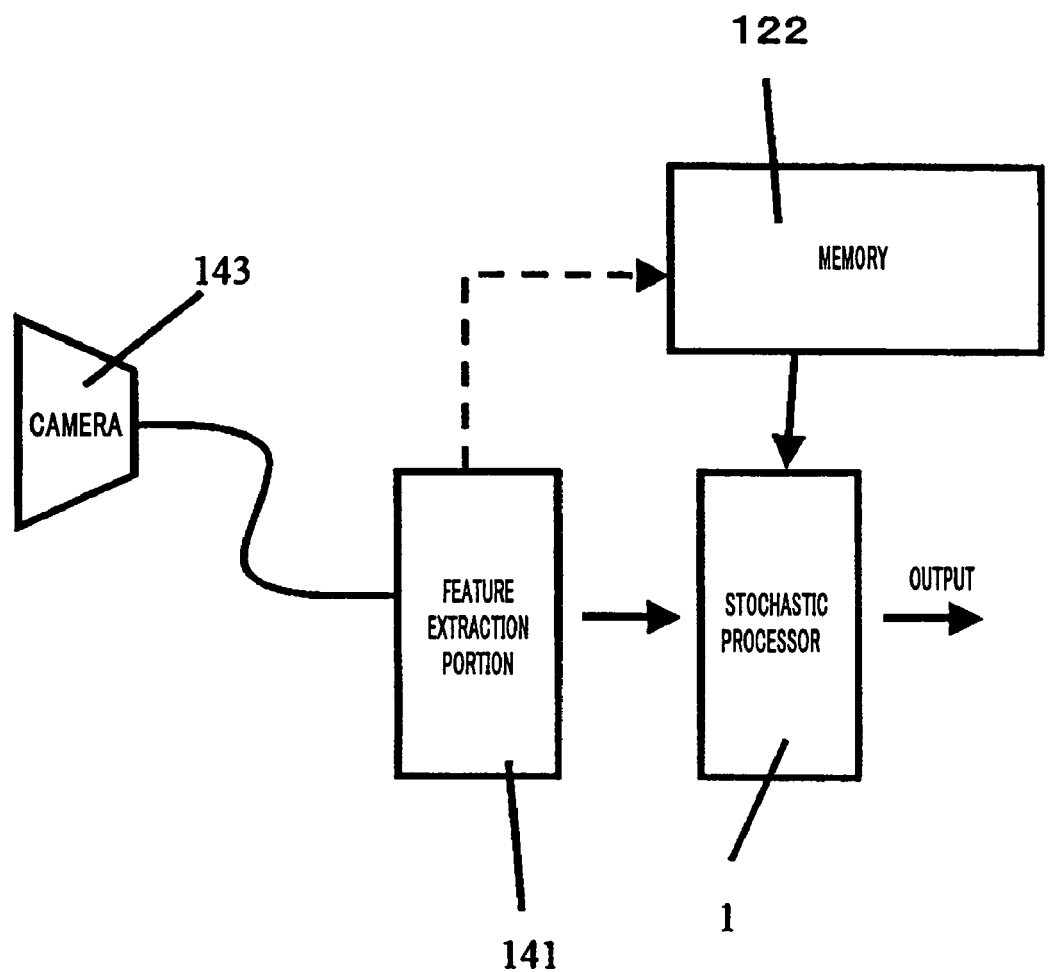
FIG. 37 is a block diagram schematically showing a configuration of an image recognition device according to an eleventh embodiment of the present invention.

FIG. 37 is a block diagram schematically showing a configuration of the image recognition device according to the eleventh embodiment of the present invention. In FIG. 37, the same reference numerals as those in FIG. 35 denote the same or corresponding parts, which will not be further described.

As shown in FIG. 37, the image recognition device comprises a camera 143 comprised of an imaging device such as CCD, a feature extraction portion 141 that extracts feature of image data input from the camera 143, a memory 122 that contains a reference vector group, and the stochastic processor 1 that compares the feature data extracted by the feature extraction portion 141 to the reference vector data group stored in the memory 122, thereby recognizing an image.

In the image recognition device configured as described above, the memory 122 stores feature quantities derived from the image, and the corresponding labels, for example, names, as data of the reference vector data group.

Figure 38:
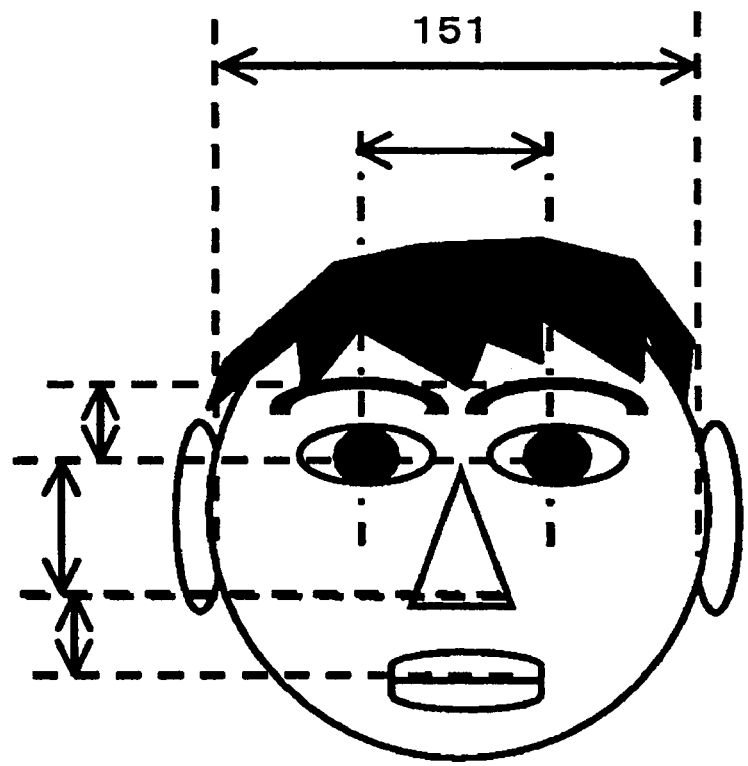
FIG. 38 is a schematic view of a feature quantity from which a face of a human being is recognized.

In FIG. 38, a method of recognizing a face of a persona is illustrated, although there are various methods of image recognition.

In this method, positions of parts of an eye, a nose, or mouth are first obtained from an image viewed through the camera 143, and a distance 151 between these parts is extracted as a feature quantity.

Such a feature quantity 151 is extracted by the feature extraction portion 141 and input to the stochastic processor 1 as an input vector. The stochastic processor 1 compares the feature quantity 151 to the reference vector data group and specifies reference vector data closest to the feature quantity 151, thereby recognizing an image corresponding to the input feature quantity as an image corresponding to the specified reference vector data.

Thereby, the image input to the camera 143 can be recognized at a very high speed.

Conventionally, such recognition process is performed in a personal computer, and therefore the feature quantity is about several tens at most. The stochastic processor 1 of the present invention is capable of comparing numerous vectors at a high speed, and therefore, of obtaining and comparing more feature quantities.

For example, by storing feature quantities in the case where direction of face is changed or ambient brightness is changed, precision of recognizing person can be greatly improved.

In this embodiment, face recognition has been described. In addition, image recognition process is carried out for other applications, including recognition of parts on a board in a production line, or recognition of a sign post from automobile, as a matter of course.

Embodiment 12

A twelfth embodiment of the present invention illustrates a behavior recognition device as the recognition process device using the stochastic processor of the first to eighth embodiments.

Figure 39:
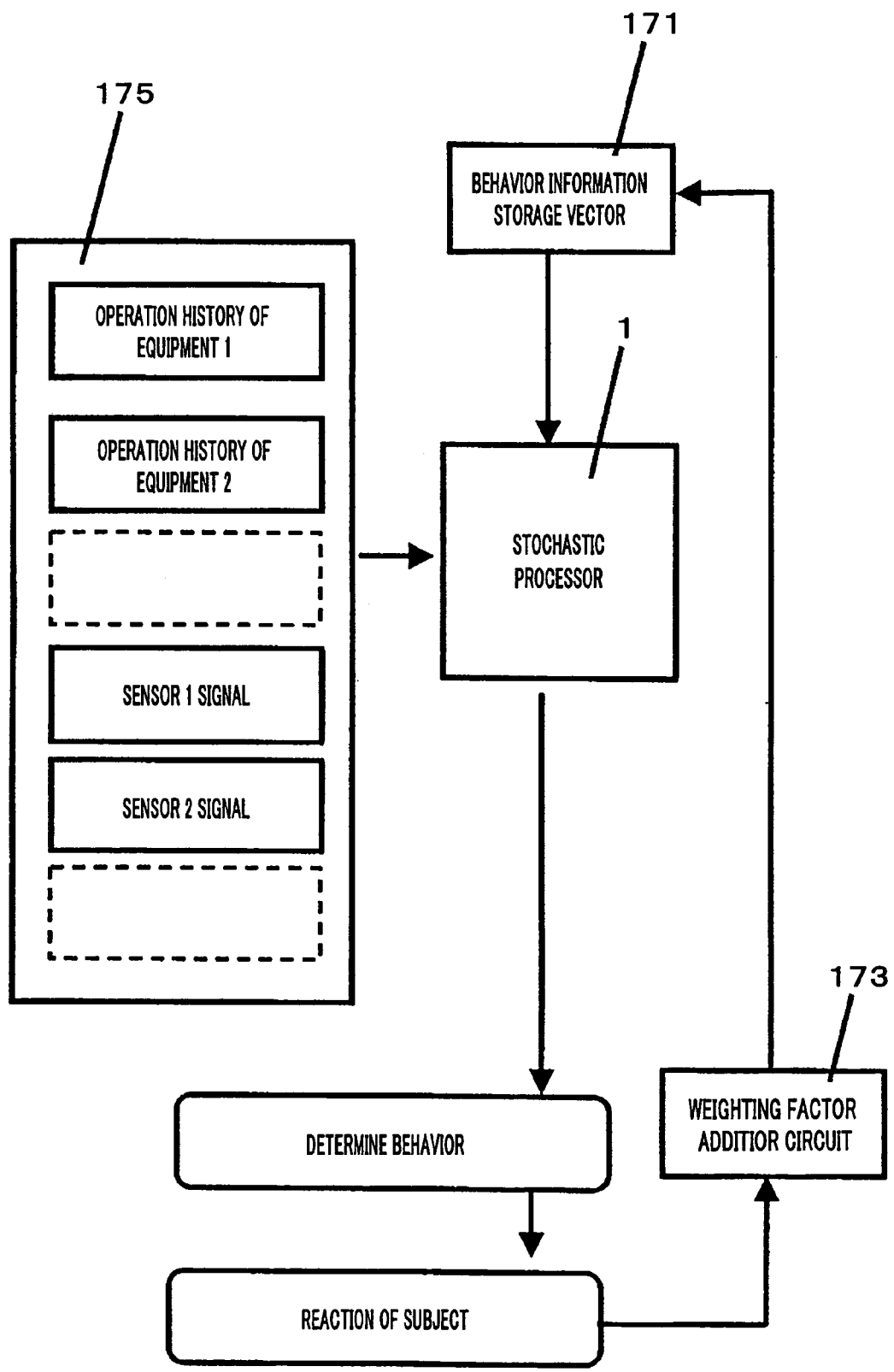
FIG. 39 is a block diagram showing a configuration of a behavior recognition device according to an embodiment of the present invention.
Figure 40:
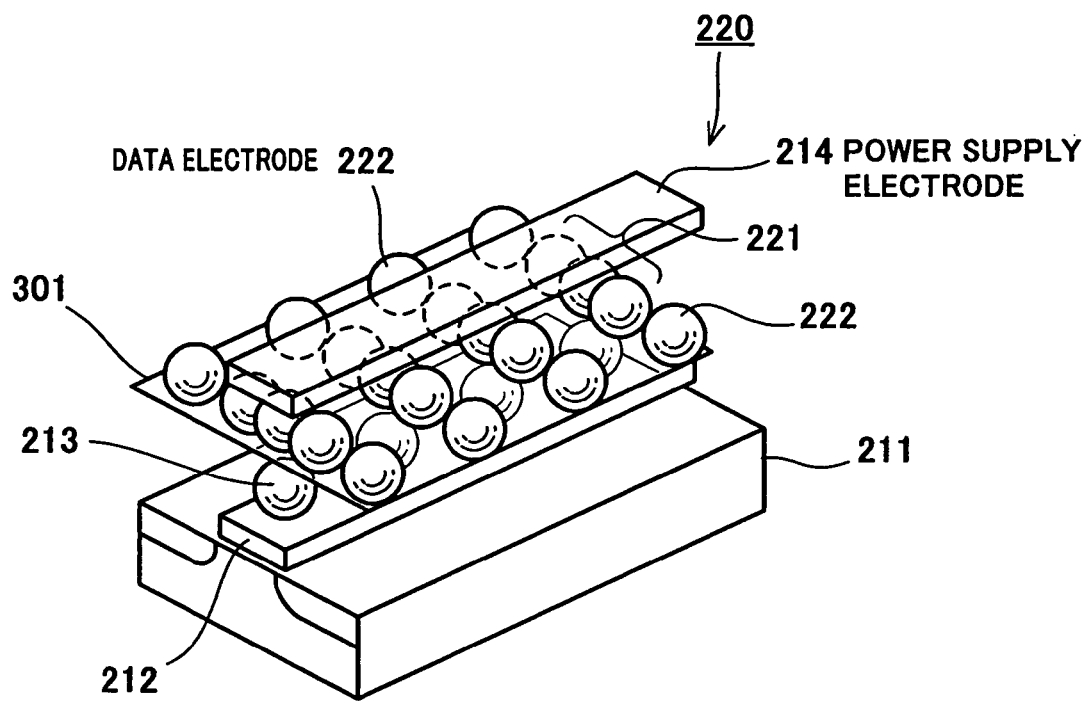
FIG. 40 is a perspective view schematically showing a structure of the conventional processor.
Figure 41A:
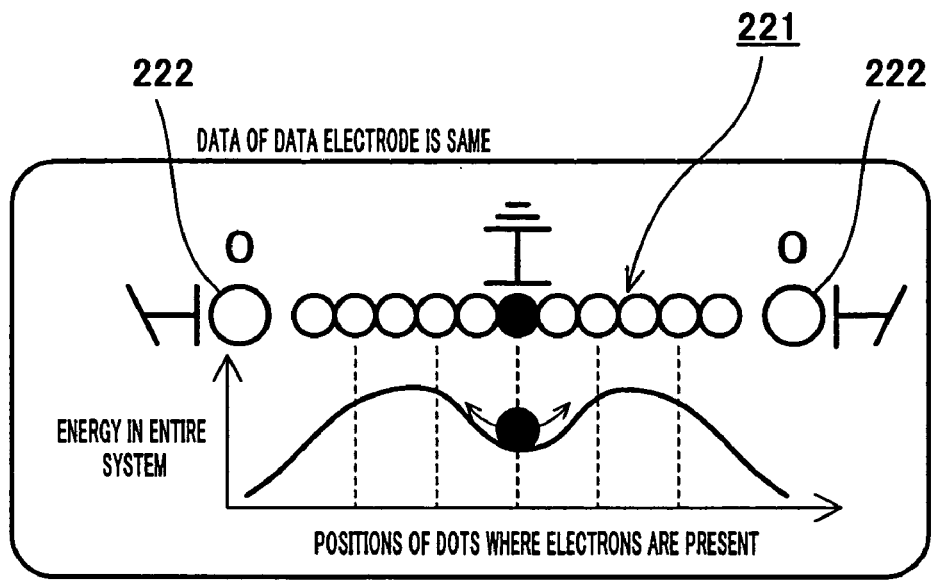
FIGS. 41A and 41B are schematic views of an equivalent circuit for explaining an operation principle of the conventional processor.
Figure 41B:
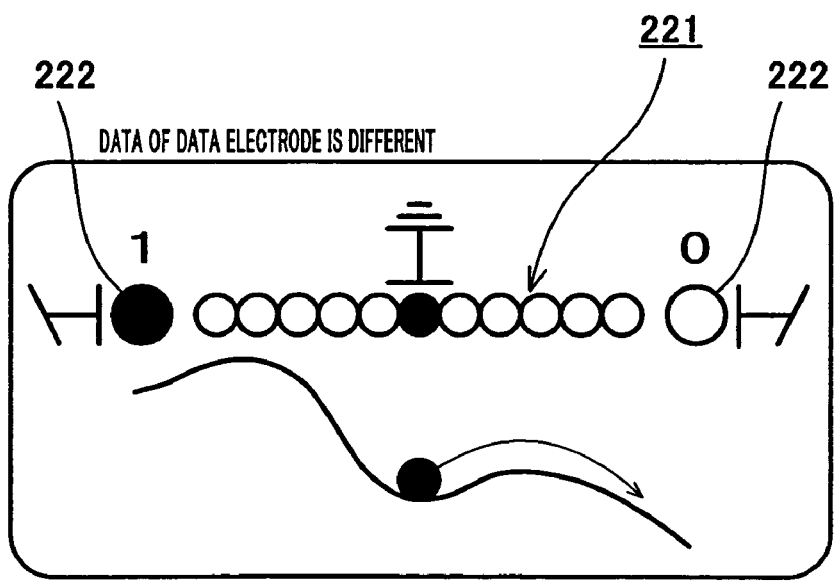

FIG. 39 is a block diagram schematically showing a configuration of the behavior recognition device according to this embodiment of the present invention. In FIG. 39, the same reference numerals as those in FIG. 35 denote the same or corresponding parts, which will not be further described.

In FIG. 39, reference numeral 171 denotes a behavior data storage vector. The behavior data storage vector contains vectorized data of a behavior of a person. Reference numeral 173 denotes a weighting factor addition circuit. The weighting factor addition circuit 173 changes weighting of the vector according to a reaction of a subject. Reference numeral 175 denotes a behavior data input vector. The behavior data input vector 175 represents a condition of the subject by vectors.

The behavior data input vector 175 involves an operation history of an electric appliance of the subject indoors or outdoors, output of an infrared sensor, an output of a room-temperature sensor, and an output of humidity sensor which are provided at home, an output of a body temperature sensor, an output of a brain-wave sensor, an output of a pulse sensor, an output of an eye sensor, an output of a perspiration sensor, and an output of a muscle potential sensor, which are provided in the vicinity of a body of a person, situation data such as time information, day information of a week, etc. Further, the feature quantities such as the voice input or the image input described in the tenth embodiment or the eleventh embodiment may be used as the situation data.

In addition to the situation data, the stochastic data storage vector 171 contains data of the behavior of the subject, or data of an operation of equipment at that time.

Upon the behavior input vector 175 being input, the stochastic processor 1 extracts a similar situation among past situations and determines the corresponding behavior. The subject reacts to the determination. For example, if the subject behaves according to the given operation without a pause, then it is judged that the subject has agreed to the given operation, or if the subject denies the given operation, then it is judged that the subject has disagreed to the given operation. Alternatively, the subject may directly respond by Yes/No.

Such a reaction of the subject is converted into a numeric value by the weighting factor addition circuit 173 to allow the numeric value of the weighting factor in the behavior data input vector 175 to be changed.

In the stochastic processor of the present invention, the easiness of selection of the vector column of the weighting factor can be controlled by providing a mechanism configured to generate pulses more than those of other vectors.

By incorporating the behavior recognition device of this embodiment into equipment, the probability at which automatic operation of equipment which is agreeable to the user appears is increased, and the probability at which automatic operation of equipment that is disagreeable to the user is reduced. Thus, a service according to each user's preference can be offered.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A stochastic processor comprising:
   a fluctuation generator configured to output an analog quantity having a fluctuation;
   a difference calculation means configured to output fluctuation difference data with an output of the fluctuation generator added to a difference in analog between two data;
   a thresholding unit configured to perform thresholding on an output of the fluctuation difference calculation means to thereby output a pulse; and
   a pulse detection means configured to detect the pulse output from the thresholding unit.

2. The stochastic processor according to claim 1, wherein the fluctuation difference calculation means includes a distance calculator configured to calculate difference between the two data in analog, and an adder configured to add an output of the distance calculator to the output of the fluctuation generator.

3. The stochastic processor according to claim 2, wherein the distance calculator includes a subtraction device, and
   the subtraction device includes a source follower circuit provided with a gate electrode to which two capacitors are connected in parallel, and
   when capacitances of the two capacitors are equal and represented by $C_1$, capacitances of NMIS and PMIS forming the source follower circuit are represented by $C_N$ and $C_P$, respectively, and an input voltage that causes an output of the source follower circuit to start increasing from a potential of a low-voltage side voltage source is $V_{Low}$,
   when a voltage $V_Z$ is calculated according to a formula given by $V_Z = V_{Low}/[2C_1/(2C_1 + C_N + C_P)]$, the two data are voltages represented by $V_a$ and $V_b$,
   subtraction in case of $V_a ≠ V_b$ in operation of $V_a - V_b$ is carried out by applying a voltage of $V_1 = V_Z - V_a$ and a voltage $V_2 = V_Z + V_b$ to electrodes of the two capacitors which are not connected to the gate electrode of the source follower circuit.

4. The stochastic processor according to claim 3, wherein the distance calculator includes two subtraction devices, and when the two data are represented by $V_{in}$ and $V_{ref}$, an output $V_{M1}$ is obtained in one of the two subtraction devices by setting $V_a = V_{in}$ and $V_b = V_{ref}$, an output $V_{M2}$ is obtained in an opposite subtraction device of the two subtraction devices by setting $V_a = V_{ref}$ and $V_b = V_{in}$, and the voltages $V_{M1}$ and $V_{M2}$ are input to the adder, thereby calculating an absolute value of difference between $V_{in}$ and $V_{ref}$.

5. The stochastic processor according to claim 1, wherein the fluctuation difference calculation means includes an adder configured to add one of the two data in analog to the output of the fluctuation generator, and a distance calculator configured to calculate a difference between an output of the adder and an opposite data of the two data in analog.

6. The stochastic processor according to claim 1, wherein the pulse detection means includes a counter configured to count the pulse.

7. The stochastic processor according to claim 1, wherein the pulse detection means includes an integrator configured to integrate a width of the pulse.

8. The stochastic processor according to claim 1, wherein the two data are element data representing elements of two vectors.

9. The stochastic processor according to claim 8, wherein the two vectors are a reference vector and an input vector which are input externally,
- a plurality of stochastic processing circuits are provided as corresponding to elements of the reference vector and elements of the input vector,
- each of the stochastic processing circuits includes a memory configured to store the element data of the input reference vector, the fluctuation difference calculation means configured to output fluctuation difference data with the output of the fluctuation generator added to the difference in analog between the element data of the reference vector stored in the memory and the element data of the input vector, and the thresholding unit, and
- the pulse detection means is configured to detect pulses output from the plurality of stochastic processing circuits.

10. The stochastic processor according to claim 9, wherein pulse output ends of the plurality of stochastic processing circuits are connected in parallel to a common wire having an end connected to the pulse detection means, and delay circuits are provided on portions of the common wire between positions where the pulse output ends of the stochastic processing circuits are connected to the common wire.

11. The stochastic processor according to claim 9, further comprising a plurality of vector column comparison circuits each including the plurality of stochastic processing circuits and the pulse detection means.

12. The stochastic processor according to claim 9, wherein the memory is an analog memory, and the element data in analog of the reference vector is stored in the analog memory.

13. The stochastic processor according to claim 12, wherein the analog memory includes a source follower circuit provided with a gate electrode to which a ferroelectric capacitor is connected, and the element data in analog of the reference vector is input to and stored in the ferroelectric capacitor.

14. The stochastic processor according to claim 13, wherein paraelectric capacitor is further connected to the gate electrode of the source follower circuit.

15. The stochastic processor according to claim 1, wherein the fluctuation difference calculation means includes an adder configured to add the difference in analog between the two data or one of the two data in analog to the output of the fluctuation generation circuit,
- the adder includes a source follower circuit provided with a gate electrode to which first and second capacitors are connected in parallel,
- wherein the output of the fluctuation generation circuit is input to the first capacitor, and the difference in analog between the two data or one of the two data in analog is input to the second capacitor.

16. The stochastic processor according to claim 15, wherein the gate electrode of the source follower circuit of the adder is connected to a ground terminal through a switching device.

17. The stochastic processor according to claim 1, wherein the counter is a ripple counter.

18. The stochastic processor according to claim 1, wherein the fluctuation is a chaos fluctuation.

19. The stochastic processor according to claim 1, wherein the fluctuation is a fluctuation obtained by amplifying a noise.

20. The stochastic processor according to claim 1, wherein the fluctuation generator is configured to generate a periodic output as an output having a fluctuation, and histogram values of an output in one period of the periodic output are substantially equal.

21. The stochastic processor according to claim 1, wherein the thresholding unit is formed by a CMIS inverter.

22. The stochastic processor according to claim 21, further comprising:
- a current detector configured to detect a current of a power supply line of the thresholding unit; and
- a fluctuation generator control circuit configured to control the output of the fluctuation generator based on an output of the current detector.

23. The stochastic processor according to claim 22, wherein the fluctuation generator control circuit is configured to increase an extent of fluctuation of the fluctuation generator when the current detected by the current detector is smaller than a predetermined value.

24. The stochastic processor according to claim 1, wherein a switching device is provided just before the thresholding unit.

25. The stochastic processor according to claim 22, wherein the fluctuation generator control circuit is configured to add a positive bias or a negative bias to the output of the fluctuation generator to cause an average value of the output to be close to a threshold of the thresholding unit, when the current detected by the current detector is smaller than a predetermined value.

26. A method of driving a stochastic processor comprising a plurality of stochastic processing circuits corresponding to elements of a reference vector and elements of an input vector which are input externally, a pulse detection means, and a predetermined number of vector column comparison circuits each having the plurality of stochastic processing circuits and the pulse detection means, wherein
- each of the stochastic processing circuits includes a fluctuation generator configured to output an analog quantity having fluctuation, a memory configured to store element data of the input reference vector, a fluctuation difference calculation means configured to output fluctuation difference data with the output of the fluctuation generator added to a difference in analog between the element data of the reference vector stored in the memory and the element data of the input vector, and a thresholding unit configured to perform thresholding on an output of the fluctuation difference calculation means and output a pulse,
- the pulse detection means is configured to detect pulses output from thresholding units of the plurality of stochastic processing circuits, thereby detecting a distance between the input vector and the reference vector, the method comprising the step of:
- when columns of the vector column comparison circuits are fewer than columns of the reference vectors and extraction of k (k: natural number) reference vectors closer in distance to the input vector is performed,
- writing the reference vectors of not more than the columns of the vector column comparison circuits to memories of the plurality of stochastic processing circuits of the vector column comparison circuits;
- extracting the k reference vectors closer to the input vector from the written reference vectors; and
- writing at least part of remaining reference vectors to vector column comparison circuits other than the vector column comparison circuits corresponding to the extracted reference vectors, thereby performing the extraction.

27. The driving method according to claim 26, wherein the steps of writing and extracting the reference vector are repeated.

28. A recognition process device comprising:
a stochastic processor according to claim 1;
a feature extraction circuit configured to extract a feature of information of an object to be recognized which is input externally and input the extracted feature to the stochastic processor as an input vector; and
a memory configured to store a reference vector group composed of vectorized feature of the information of the object, wherein
the stochastic processor is configured to identify a reference vector corresponding to the input vector from among the reference vector group stored in the memory.

29. The recognition process device according to claim 28, wherein the information of the object is voice.

30. The recognition process device according to claim 29, wherein the reference vector group is comprised of a vector group with feature quantities of the voice arranged in time series, and have vectors of plural columns in which the feature quantities of the voice recognized as identical by a human being are shifted from each other in time series.

31. The recognition process device according to claim 28, wherein the information of the object is an image.

32. The recognition process device according to claim 31, wherein the reference vector group is comprised of a vector group obtained by vectorizing feature quantities of an image which are recognized as identical by the human being and have different numeric values.

33. The recognition process device according to claim 32, wherein the image recognized as identical by the human being is a part of the human being, and the feature quantities of the image with different numeric values is a distance between parts of the human being.

34. The recognition process device according to claim 28, wherein the information of the object is a behavior of the human being, and the recognized behavior is output.

35. The recognition process device according to claim 34, wherein the reference vector group is comprised of a vector group obtained by vectorizing numerically represented data of action information of the human being.

36. The recognition process device according to claim 35, wherein when a reaction to the output behavior is agreeable to the human being, at least part of a value of the reference vector is changed to allow the reference vector corresponding to the output behavior to be easily selected, and when the reaction to the output behavior is disagreeable to the human being, the at least part of the value of the reference vector is changed to make it difficult for the reference vector corresponding to the output behavior to be selected.

37. The recognition process device according to claim 36, wherein the action information involves at least one of an operation history of electric appliance, an output of an infrared sensor, an output of a room-temperature sensor, an output of a humidity sensor, an output of a body temperature sensor, an output of a brain-wave sensor, an output of a pulse sensor, an output of an eye sensor, an output of a perspiration sensor, an output of a muscle potential sensor, time information, day information of a week, and the output of the recognition process device.

* * * * *

UNITED STATES PATENT AND TRADEMARK OFFICE
CERTIFICATE OF CORRECTION

PATENT NO. : 7,493,353 B2  Page 1 of 1
APPLICATION NO. : 10/781819
DATED : February 17, 2009
INVENTOR(S) : Michihito Ueda et al.

It is certified that error appears in the above-identified patent and that said Letters Patent is hereby corrected as shown below:

In Column 4, Line 57, change "of $V_a$ 劫 $V_b$ in" to --of $V_a \geq V_b$ in--; and In Column 26, Line 45 (Claim 3), change "of $V_a$ 劫 $V_b$ in" to --of $V_a \geq V_b$ in--.

Signed and Sealed this

Twenty-third Day of February, 2010

David J. Kappos
*Director of the United States Patent and Trademark Office*